US012577941B2

(12) United States Patent

Myers et al.

(10) Patent No.: US 12,577,941 B2

(45) Date of Patent: Mar. 17, 2026

(54) HIGH CAPACITY, SHALLOW DRAFT, OCEAN-BORNE WIND TURBINE

(71) Applicant: TOWS, Inc., Chestnut Hill, MA (US)

(72) Inventors: Andrew T. Myers, Milton, MA (US); Jeremy J. Papadopoulos, Chestnut Hill, MA (US)

(73) Assignee: Tows, Inc.

( * ) Notice: Subject to any disclaimer, the term of this patent is extended or adjusted under 35 U.S.C. 154(b) by 0 days.

(21) Appl. No.: 19/067,448

(22) Filed: Feb. 28, 2025

(65) Prior Publication Data

US 2025/0198386 A1     Jun. 19, 2025

Related U.S. Application Data

(63) Continuation of application No. 17/429,087, filed as application No. PCT/US2020/018647 on Feb. 18, 2020, now abandoned.

(Continued)

(51) Int. Cl.
*F03D 13/25*          (2016.01)
*B63B 35/44*          (2006.01)
(Continued)

(52) U.S. Cl.
CPC .............. *F03D 13/25* (2016.05); *B63B 35/44* (2013.01); *F03D 9/257* (2017.02); *F03D 15/00* (2016.05);
(Continued)

(58) Field of Classification Search
CPC ....... F03D 13/25; F03D 13/256; F03D 7/0202
See application file for complete search history.

(56) References Cited

U.S. PATENT DOCUMENTS

| | | |
|---|---|---|
| 6,294,844 B1 | 9/2001 | Lagerwey |
| 7,075,189 B2 | 7/2006 | Heronemus et al. |

(Continued)

FOREIGN PATENT DOCUMENTS

| | | |
|---|---|---|
| CN | 102668363 A | 9/2012 |
| CN | 105209754 A | 12/2015 |

(Continued)

OTHER PUBLICATIONS

Abduvaitov, "Structural optimisation of Tension Leg Platform for an Offshore Wind Turbine," Politecnico di Torino (2024): 112 pages.

(Continued)

*Primary Examiner* — Michael L Sehn
(74) *Attorney, Agent, or Firm* — Adler Pollock & Sheehan P.C.

(57)          ABSTRACT

A high capacity, shallow draft, ocean-borne wind turbine is described, featuring a floating structure with at least three floats and a turbine rotor coupled to a generator with a power capacity of at least 3 MW. The turbine includes multiple blades, each with a length, and an operational draft less than about one-sixth of the blade length. Variations include configurations with round surface piercing floats and specific arrangements of four floats in a square formation. The design ensures a draft in operation of less than 1 meter per MW of rated capacity, providing an efficient and stable platform for offshore wind energy generation.

1 Claim, 10 Drawing Sheets

Related U.S. Application Data

(60) Provisional application No. 62/896,903, filed on Sep. 6, 2019, provisional application No. 62/806,085, filed on Feb. 15, 2019.

(51) Int. Cl.
*F03D 9/25* (2016.01)
*F03D 15/00* (2016.01)

(52) U.S. Cl.
CPC ... *B63B 2035/446* (2013.01); *F05B 2220/706* (2013.01); *F05B 2220/7066* (2013.01); *F05B 2240/93* (2013.01); *F05B 2240/932* (2013.01); *F05B 2260/4021* (2013.01); *Y02E 10/72* (2013.01); *Y02E 10/727* (2013.01)

(56) References Cited

U.S. PATENT DOCUMENTS

| | | | |
|---|---|---|---|
| 8,164,212 B2 | 4/2012 | Barber | |
| 8,178,993 B1 | 5/2012 | Barber | |
| 8,471,396 B2 | 6/2013 | Roddier et al. | |
| 8,471,399 B2 | 6/2013 | Lefranc | |
| 8,752,495 B2 | 6/2014 | Jahnig et al. | |
| 8,801,363 B2 | 8/2014 | Williams | |
| 9,139,266 B2 | 9/2015 | Roddier et al. | |
| 9,856,621 B2 * | 1/2018 | Johnson, Jr. | E02D 27/525 |
| 9,976,540 B2 * | 5/2018 | Guyot | B63B 35/44 |
| 2003/0168864 A1 | 9/2003 | Heronemus et al. | |
| 2009/0091136 A1 | 4/2009 | Viterna | |
| 2010/0219645 A1 | 9/2010 | Yamamoto et al. | |
| 2011/0068729 A1 | 3/2011 | Barber | |
| 2011/0241347 A1 | 10/2011 | Boureau et al. | |
| 2013/0270837 A1 | 10/2013 | Mongeau et al. | |
| 2016/0061192 A1 | 3/2016 | Guyot | |
| 2017/0175713 A1 | 6/2017 | Barber | |
| 2018/0134344 A1 | 5/2018 | Dagher et al. | |
| 2022/0128033 A1 | 4/2022 | Myers et al. | |

FOREIGN PATENT DOCUMENTS

| | | | |
|---|---|---|---|
| CN | 105569928 A | 5/2016 | |
| CN | 108698671 A | 10/2018 | |
| CN | 114207277 A | 3/2022 | |
| CN | 116902175 A | 10/2023 | |
| CN | 117341915 A | 1/2024 | |
| DE | 10 2008/024829 A1 | 11/2009 | |
| DE | 102011052024 A1 | 1/2013 | |
| DE | 10 2011/119776 A1 | 6/2013 | |
| DE | 102012009145 A1 | 11/2013 | |
| DE | 20 2013/001179 U1 | 5/2014 | |
| DE | 10 2013/202156 A1 | 8/2014 | |
| DE | 202016001490 U1 | 4/2016 | |
| DE | 10 2016/206708 A1 | 10/2017 | |
| EP | 4240965 A1 | 9/2023 | |
| ES | 2324276 A1 | 8/2009 | |
| ES | 2387342 A1 | 9/2012 | |
| FR | 2967642 A1 | 5/2012 | |
| FR | 2970748 B1 | 8/2016 | |
| JP | 6522586 B2 | 5/2019 | |
| KR | 20130048853 A | 5/2013 | |
| KR | 20240098340 A | 6/2024 | |
| WO | WO-2009/064737 A1 | 5/2009 | |
| WO | WO-2009/067023 A1 | 5/2009 | |
| WO | WO-2010/123847 A1 | 10/2010 | |
| WO | WO-2011/066166 A1 | 6/2011 | |
| WO | WO-2012/069498 A1 | 5/2012 | |
| WO | WO-2013/040871 A1 | 3/2013 | |
| WO | WO-2013/079698 A1 | 6/2013 | |
| WO | WO-2013/135291 A1 | 9/2013 | |
| WO | WO-2013/167652 A1 | 11/2013 | |
| WO | WO-2014013097 A1 | 1/2014 | |
| WO | WO-2014/122165 A1 | 8/2014 | |
| WO | WO-2014/125114 A1 | 8/2014 | |
| WO | WO-2014/170027 A1 | 10/2014 | |
| WO | WO-2015/004737 A1 | 1/2015 | |
| WO | WO-2016/083634 A1 | 6/2016 | |
| WO | WO-2017/105663 A1 | 6/2017 | |
| WO | WO-2017/207934 A1 | 12/2017 | |
| WO | WO-2017/212086 A1 | 12/2017 | |
| WO | WO-2017/220878 A1 | 12/2017 | |
| WO | WO-2018/234986 A1 | 12/2018 | |
| WO | WO-2020/168343 A2 | 8/2020 | |
| WO | WO-2021/240132 A1 | 12/2021 | |
| WO | WO-2023/098994 A1 | 6/2023 | |
| WO | WO-2023/170224 A1 | 9/2023 | |
| WO | WO-2023/242310 A1 | 12/2023 | |

OTHER PUBLICATIONS

Aubault et al., "Windfloat: A Floating Foundation for Offshore Wind Turbines Part III: Structural Analysis," Proceedings of the ASME 2009 28th International Conference on Ocean, Offshore, and Arctic Engineering (2009): OMAE2009-79232.

Bachynski, "Fixed and Floating Offshore Wind Turbine Support Structures," Chapter 4 in Offshore Wind Energy Technology, John Wiley and Sons, 2018, pp. 103-142.

Bashetty et al., "Review on Dynamics of Offshore Floating Wind Turbine Platforms," Energies 14 (2021): 6026.

BVG Associates, "Guide to a Floating Offshore Wind Farm," Offshore Renewable Energy Catapult, May 2023, 176 pages.

Casale et al., "Preliminary Design of a Floating Wind Turbine Support Structure and Relevant System Cost Assessment," Wind Engineering 34.1 (2010): 29-50.

Cordle et al., "State of the Art in Floating Wind Turbine Design Tools," 21st International Offshore and Polar Engineering Conference (2011): 9 pages.

Extended European Search Report for EP Application No. 20756505.2 dated Aug. 11, 2022.

Goupee et al., "Experimental Comparison of Three Floating Wind Turbine Concepts," Journal of Offshore Mechanics and Arctic Engineering 136 (2014): 020906.

Hong et al., "Design and Analysis of an Array of Floating Wind Turbine Structures," Proceedings of the Tenth ISOPE Pacific/Asia Offshore Mechanics Symposium (2012): 5-10.

Hu et al., "Comparative analysis of dynamic and structural responses of three floating offshore wind turbine foundations," Ocean Engineering 320 (2025): 120252.

International Search Report and Written Opinion for International Application No. PCT/US2020/018647 mailed Jul. 30, 2020.

Jung et al., "The properties of the global offshore wind turbine fleet," Renewable and Sustainable Energy Reviews 186 (2023): 113667.

Lefebvre et al., "Preliminary design of a floating support structure for a 5 MW offshore wind turbine," Ocean Engineering 40 (2012): 15-26.

Li, "Full-coupled analysis of offshore floating wind turbine supported by very large floating structure with consideration of hydroelasticity," Renewable Energy 189 (2022): 790-799.

Ojo et al., "Multidisciplinary design analysis and optimization of floating offshore wind turbine substructures: A review," Ocean Engineering 266 (2022): 112727.

Pacheco et al., "An evaluation of offshore wind power production by floatable systems: a case study from SW Portugal," Energy 131 (2017): 239-250.

Robertson et al., "Loads Analysis of Several Offshore Floating Wind Turbine Concepts," International Society of Offshore and Polar Engineers 2011 Conference (2011): 8 pages.

Tande et al., "Floating offshore turbines," Advanced Review (2014): 16 pages.

Wen et al., "The power performance of an offshore floating wind turbine in platform pitching motion," Energy 154 (2018): 508-521.

Yuan et al., "Deep analysis of power regulation on fatigue loads and platform motion in floating wind turbines," Ocean Engineering 313 (2024): 119667.

* cited by examiner

CONSTRUCTION

50'

900

915

920
platform 915
10:1
pulleys

925

910 winch

900

915 sheaves

B   A

LIFT TOWER
Bracing cables to
A,B not shown

925

935
retractable wheel
for moving

HIGH CAPACITY, SHALLOW DRAFT, OCEAN-BORNE WIND TURBINE

CROSS REFERENCE TO RELATED APPLICATIONS

This application is a continuation of application Ser. No. 17/429,087, filed Aug. 6, 2021; which is a U.S. National Stage Application of International Application No. PCT/US20/18647, filed Feb. 18, 2020; which claims the benefit of priority to U.S. provisional patent application Ser. No. 62/806,085, filed Feb. 15, 2019; and U.S. provisional patent application Ser. No. 62/896,903, filed Sep. 6, 2019, all of which are incorporated by reference in their entireties.

BACKGROUND

Offshore wind resources offer high average power density and leading wind-power countries (Denmark, England, Germany) are developing cost-effective ways to exploit them. Recently, the U.S. Bureau of Ocean Energy management auctioned three lease areas 20 miles off the coast Martha's Vineyard for an astounding total price of $405M or $250K/km², a price comparable to that of lucrative oil and gas leases. The three auction winners were Equinor, Shell and Copenhagen Infrastructure Partners and the high prices indicate the importance of this emerging market in the United States. The development of these areas is expected to use fixed-bottom rather than floating structures because of the higher technology readiness of fixed-bottom technology. Offshore wind turbines made with existing technology are expensive with capital expenditures for installation around $4M USD/MW of power capacity and operational expenses around $160K USD/MW/year. In Europe, the fixed-bottom offshore wind energy industry is fairly mature with ~15 GW of installed capacity. In the United States, the fixed-bottom offshore wind energy industry is in its infancy, but expected to grow very quickly. But by simply transplanting a heavy-tower land turbine and placing it on a massive underwater base, costs are accepted that make the produced electricity (about $0.10/kWh) unaffordable without subsidy (down to $0.07/kWh). And even then this cost is not truly competitive compared to fossil plants under $0.04/kWh). Globally, the floating offshore wind energy is in its infancy, consisting of only a handful of demonstration projects, none of which are in the United States. These demonstrations also have essentially transplanted conventional (slender tower with heavy nacelle) onshore turbines, onto massive floating bases that exceed the bottom-fixed underwater bases in cost. So their electricity is even more expensive.

In support of ocean wind turbines, U.S. states have committed to generate a large defined power output from ocean wind by 2030. About 2200 large (e.g. 10 MW, 120 m tower) offshore turbines will be installed in ten years, a rate of 220/year. But to seriously address climate change concerns, all U.S. fossil fuel power plants need to be replaced as they retire. This will take 120,000 turbines. At the currently planned installation rate this will take an unacceptable 500 years. A lower-cost turbine producing cost-saving electricity, and manufacturable in large volumes with existing infrastructure, could profitably be installed at a rate of 4,000 per year, so fossil fuel electricity could theoretically be supplanted by 2050.

Therefore, wind turbines, particularly for offshore application, are needed that are much less expensive to build, install, and operate on a per MW rated capacity basis compared to current offshore wind turbines.

SUMMARY

Floating wind turbines are disclosed which are several times less expensive on a per MW rated capacity basis compared to current technology. They are far easier to manufacture by current businesses with little investment, they are usable in deeper waters off California and Maine, they can be installed quickly with conventional small tug-boats rather than slowly with expensive European jack-up ships, and they can be inexpensively repaired according to a swap-out and tow-to-port strategy, where a replacement unit is installed in less than a day, and the damaged unit is repaired at port.

The high capacity, shallow draft, ocean-borne wind turbine may include a floating structure with at least three floats, defining an area and having a draft in operation. The turbine rotor, supported by the float structure, can be coupled to a generator with a power capacity of at least 3 MW. A plurality of turbine blades may drive the rotor, with each blade having a length, l. The draft in operation of the floating structure can be less than about 1/6.

The wind turbine described in the previous claim may have a draft in operation that is less than 1.5.

The wind turbine may also have a draft in operation that is less than 1/9.

The draft in operation of the wind turbine can be less than about 1 meter per MW of rated capacity.

The floats of the wind turbine may be round surface piercing floats, with the draft being less than 1.5 times the diameter of these floats.

The floating structure of the wind turbine may include four floats arranged in a square, with a distance of about 36 meters to about 72 meters between adjacent floats. Each pair of diagonally opposite floats can be rigidly connected.

Another high capacity, shallow draft, ocean-borne wind turbine may include a floating structure with at least three floats, defining an area and exhibiting a draft in operation. The turbine rotor, supported by the float structure, can be coupled to a generator with a power capacity of at least 3 MW. A plurality of turbine blades may drive the rotor, with each blade having a length, l. The wind turbine can have a draft in operation of less than about 1 meter per MW of rated capacity.

The wind turbine described in the previous claim may have a draft in operation that is less than 1/9.

The floats of the wind turbine may be round surface piercing floats, with the draft being less than 1.5 times the diameter of these floats.

The floating structure of the wind turbine may include four floats arranged in a square, with a distance of about 36 meters to about 72 meters between adjacent floats. Each pair of diagonally opposite floats can be rigidly connected.

The wind turbine may have a heave frequency larger than about 0.2 Hz when it is not operating.

A shallow draft, ocean-borne wind turbine may have a mass of at least 30,000 kg and include a square floating structure of four interconnected circular floats defining an area. The floats can be connected diagonally with rigid trusses. A superstructure may extend upward from the floating structure, comprising four struts supported by respective floats and forming an apex. A nacelle-less turbine rotor can be mounted at the apex, including a direct drive generator. A plurality of turbine blades may drive the rotor, with each blade having a length, l. The floating structure can be moored with a mooring cable attached to a fixed underwater mooring point. The wind turbine may have a rated power capacity of at least 3 MW, and the draft in operation of the floating structure can be less than 1/6.

A floating wind turbine may have three or more float-supported towers terminating at a fixed rotor-axle, with more than 50% of the un-anchored system mass above the water-line.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

DETAILED DESCRIPTION

Figure 1:
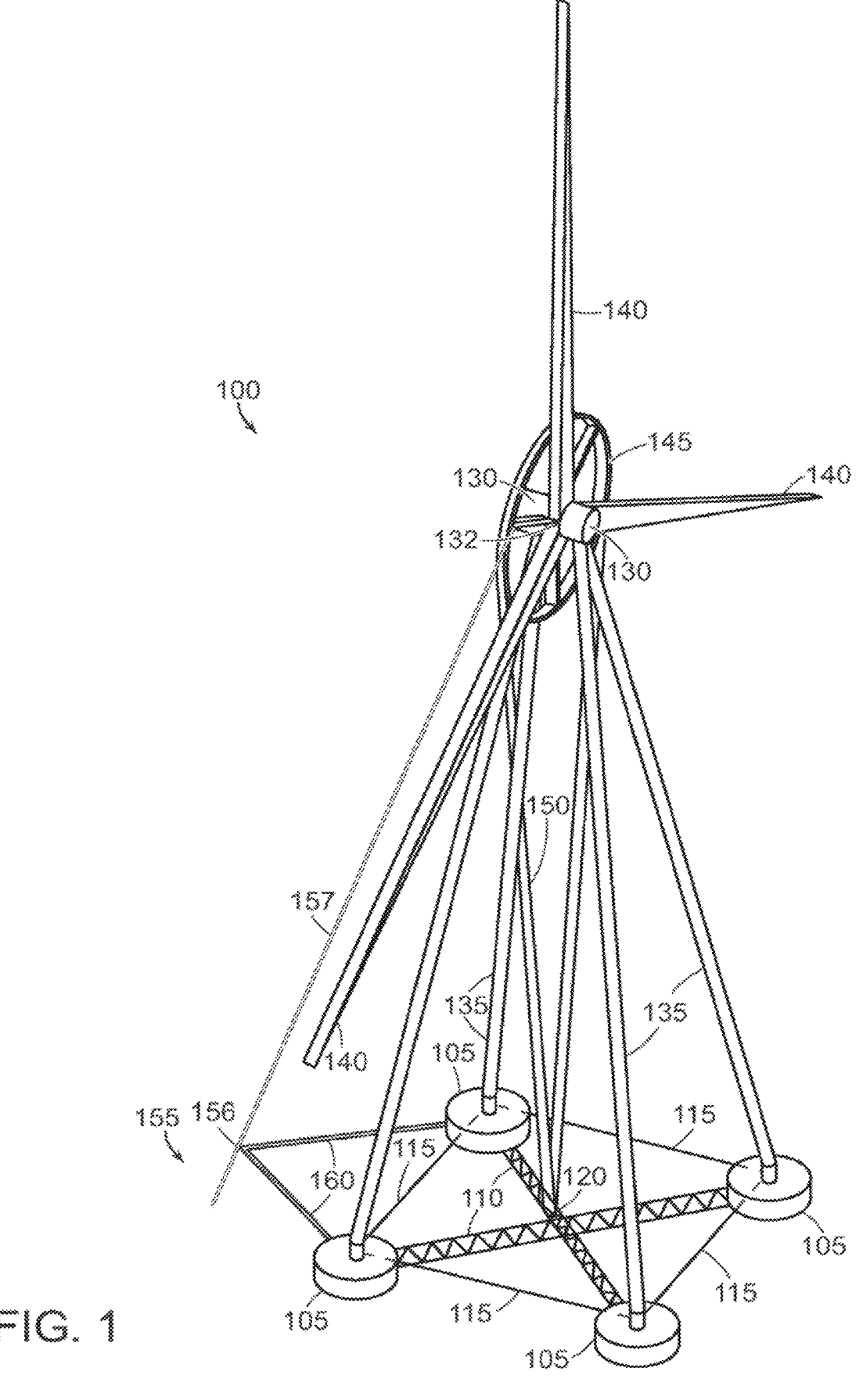
FIG. 1 provides an illustration of an embodiment of a 10 MW rated capacity wind turbine suitable for offshore application; the anchor system is not shown.

The various concepts introduced above and discussed in greater detail below may be implemented in any of numerous ways, as the described concepts are not limited to any particular manner of implementation. Examples of specific implementations and applications are provided primarily for illustrative purposes.

Floating wind turbines are disclosed which are several times less expensive on a per MW basis compared to current bottom-fixed or floating support technology. Advantages of the disclosed wind turbines include that they can be several times (e.g., four to ten times) lighter than current technology and they can have a much shallower draft than current technology, enabling quayside construction and launch in shallow ports requiring little or no dock-strengthening, and no heavy cranes nor special installation ships, and saving greatly on capital expenditures. The thin metals associated with light weight provide a great advantage in manufacturing, because they can be bent and joined with existing common fabrication equipment. So unlike existing offshore turbines that cannot be built in the U.S. until billions of dollars of manufacturing and transport upgrades are made, the disclosed invention can be manufactured without delay, leading to many U.S. jobs. Additionally, unlike any existing or planned offshore turbines, the disclosed invention is suited to rapid installation by small-boat towing and a quick connection to the mooring line and electric cable. This alters the maintenance equation, because when a turbine is either damaged or due for refitting, a replacement can first be installed (with only 1 day of downtime) and the damaged unit can be returned to port for repair at leisure, with more resources and lower daily cost. Further advantages include that the wind turbines can have fewer wearable components than existing technology, and some of the wearable components that remain can be located near sea level, rather than up in the hub, where they are much more easily maintained, saving on operation and maintenance costs. For example, the gearing and generator need not be sited near or at the rotor axis. Further advantages include that a nacelle is not needed or does not need to slew, the tower does not need to be slender (hence heavy), and compared to the tremendous ballast of current floating technology, little or none is needed.

In brief, once a turbine can orient to the wind by swinging at anchor, many expensive features may be avoided. The nacelle does not need to slew, the tower does not need to be slender, and the gearing/generator need not be sited at the rotor axis. These factors allow the weight to be reduced and lowered to deck level, leading to reduced flotation requirements.

Compared with existing offshore turbines, the wind turbines of the present disclosure can also use a cheaper generator, and, in embodiments, dispense with a nacelle yawing system and/or a gearbox.

One embodiment is a wind turbine, (i) comprising a) a plurality of floats and one or more connectors interconnecting the plurality of floats; b) a plurality of towers connected to the plurality of floats; and c) a turbine rotor, including a hub and a plurality of blades, structurally supported by the plurality of towers, the turbine rotor coupled to an electrical generator; and (ii) (a) having a rated capacity of at least about 1 MW and a draft of less than about 1 meter per 1 MW of rated capacity, and/or (b) having a mass of at least 30,000 kg and a draft of less than about one sixths of the length of the blades.

A further embodiment is a wind turbine, comprising a) a plurality of floats and one or more connectors interconnecting the plurality of floats; b) a plurality of towers connected to the plurality of floats; and c) a turbine rotor, including a hub and a plurality of blades, structurally supported by the plurality of towers, the turbine rotor coupled to an electrical generator.

A further embodiment is a wind turbine, comprising an axle, a hub with blades connected to the hub, the hub rotatably connected to the axle, a plurality of towers converging to and structurally supporting the axle, and the hub coupled to an electrical generator.

As used herein, the hub "coupled" to an electrical generator, refers to a coupling that allows transfer of rotational energy of the hub to rotational energy of a shaft that drives the electrical generator. In embodiments, this coupling is achieved by use of a mechanical drive system comprising a sheave fixedly connected to the hub, a belt, a sheave of a first diameter, a drum of a second diameter connected to a shaft which drives the electrical generator, the first diameter being larger than the second diameter (e.g., 15:1 to 40:1).

A further embodiment is a wind turbine, wherein, when floating, the wind turbine has a part below water, and the below water part has a weight, not including weight of ropes and anchors, that is less than 50% of total weight of the wind turbine.

In some embodiments, the wind turbine, when floating, has a part below water, and the below water part has a weight, not including weight of ropes and anchors, that is less than 50% of total weight of the wind turbine.

In some embodiments, the blades of the wind turbine form more than 20% of system weight, not including weight of ropes and anchors.

In some embodiments, the turbine has a weight in metric tons (MT) that is less than 35*(rated capacity of the wind turbine in MW)^1.5.

In some embodiments, the wind turbine has a rated capacity of at least about 500 kW, at least about 1 MW, at least about 2 MW, at least 5 MW, or at least about 10 MW. In other embodiments, the wind turbine has a rated capacity of about 500 kW to about 20 MW. In aspects of these embodiments, the wind turbine has a draft of less than about 1 meter per 1 MW of rated capacity, less than about 2 meter per 1 MW of rated capacity, or less than about 50 cm per 1 MW rated capacity.

As used herein, "rated capacity" refers to the intended full-load sustained output of a wind turbine.

In some embodiments, the wind turbine has a draft of less than about 1 meter per 1 MW of rated capacity, less than about 2 meter per 1 MW of rated capacity, or less than about 50 cm per 1 MW rated capacity.

In some embodiments, the wind turbine further comprises an axle and the hub is rotatably connected to the axle. During operation of the wind turbine (i.e, typically, when the wind speed is at least the cut-in speed) the hub, with the blades attached to it, rotates around the axle, the axle being structurally supported by the plurality of towers.

The wind turbines described herein have a shallow draft compared to conventional floating wind turbines. As used herein, "draft" refers to the lowest point of a wind turbine, when floating offshore and without substantial wind (i.e., less than 5 mph), below the water level, except for non-buoyant material such as, for example, power cables, mooring line(s), or tubes with opening to allow water to fill the tube to a certain fill level. Thus, for illustration purposes, if a wind turbine structure has a solid metal rod extending vertically 50 meters below water level and thereby also below all of the floats, this does not mean that the draft of that wind turbine is 50 meters. Typically, the draft of a wind turbine is the depth above which 90% of the submerged buoyant volume is found.

In some embodiments, the wind turbine has a mass of at least about 30,000 kg, of at least about 100,000 kg, of at least about 250,000 kg, of at least about 500,000 kg, or at least about 1,000,000 kg; and a draft of less than about one sixth, one seventh, one eighth, or one ninth of the length of the blades. In an aspect of this embodiment, the draft is less than about one ninth of the length of the blades.

In some embodiments, the wind turbine has a draft of less than about one sixth, one eighth, one ninth, or one tenth of the length of the blades.

In some embodiments, the wind turbine has a draft of less than 15 meters, of less than 10 meters, of less than 8 meters, of less than 6 meters, of less than 5 meters, of less than 3 meters, or less than 2 meters.

In some embodiments, the wind turbine comprises a plurality of floats which are spaced apart defining an area A between the floats, the blades have a length L, and L/√A is less than about 3. The area A is measured in the plane at waterline, the vertices of the area A being provided by the centroids of the floats in that plane.

In some embodiments, the wind turbine comprises a plurality of floats which are spaced apart defining an area A between the floats, the blades have a length L, and L/√A is between about 1 and about 3.

In some embodiments, the wind turbine comprises a plurality of floats which are spaced apart defining an area A between the floats, the blades have a length L, and L/√A is between about 1 and about 2.5.

In some embodiments, the wind turbine has connections between the plurality of floats which include one or more rigid connectors selected from beams and trusses.

In some embodiments, the connections between the plurality of floats include tensioned cables.

In some embodiments, at least two floats of the plurality of floats are rigidly connected. In an aspect of this embodiment, floats in positions approximately opposite to the centroid of the arrangement formed by the floats are connected with rigid connectors.

Rigid connectors can be, but are not limited to beams and trusses. A variety or materials in a variety of shapes can be used. Typically, for sea water applications of the turbine, materials of the wind turbine exposed to sea water will be chosen to be corrosion resistant or must be painted. Such materials can be commercially obtained.

In some embodiments, at least three floats of the plurality of floats are rigidly connected.

In some embodiments, at least four floats of the plurality of floats are rigidly connected.

While the number of floats of the wind turbine is not limited, a large number (e.g., over 10) floats is less efficient. In some embodiments, the wind turbine of any one of the preceding claims, wherein the plurality of floats is 2 to 10 floats.

As referred herein, a "float" provides at least 5% of the required buoyancy for the entire wind turbine. If it provides less, it is not considered a "float". The shape of the floats is not limited to a particular shape; however, more typical floats have a shape that includes cylindrical or conical shapes, for example, bifrustum (e.g., biconical), one-sided truncated bifrustum (e.g., one-sided truncated biconical), or two-sided truncated bifrustum (e.g., truncated biconical). Additionally, typically, the float has an approximately equi-axed geometry in which the width (at the waterline) is not much less than the total depth of penetration or draft, nor much greater (a flat barge is structurally inefficient).

In some embodiments, the plurality of floats includes floats that are approximately biconical.

In some embodiments, the floats which are approximately biconical include an apex-up top cone with truncated top and an apex-down bottom cone connected below the apex-up top cone.

In some embodiments, the apex-down bottom cone is truncated to reduce the draft. The truncation may be solidly capped, or it can be left open to partially equalize internal pressure (where the air may be trapped by a membrane or bladder), or it can be left open for the purpose of mounting a rudder or a water trapping tube.

In some embodiments, the plurality of floats are cylindrical surface piercing floats, and float has a draft of less than half its diameter.

In some embodiments, the plurality of floats are adapted to provide a maximum buoyancy of about 120% to about 300% the weight-required buoyancy for the wind turbine In some embodiments, the turbine rotor is positioned such that the blades rotate between at least two towers of the plurality of towers: at least one upwind tower, and at least one downwind tower, which support the fixed axle from both ends in a way that reinforces the tower structure. In an aspect of this embodiment, the wind turbine does not have a nacelle.

In some embodiments, each tower of the plurality of towers is connected on top of a float.

In some embodiments, the wind turbine is characterized by a heave frequency larger than about 0.2 Hz, when it is not operating.

In some embodiments, the wind turbine has a mass of more than 1,000,000 kg.

In some embodiments, the wind turbine does not have a nacelle.

In some embodiments, the wind turbine is floating.

In some embodiments, the electrical generator is mounted on a structural support connected to the one or more connectors.

In some embodiments, the electrical generator, when the wind turbine is floating on water, is positioned closer to the water level than the turbine rotor.

In some embodiments, the turbine rotor is coupled to the electrical generator with a coupling comprising a sheave holding a belt, the sheave connected to the turbine rotor to rotate with rotation of the turbine rotor and the belt connected to a shaft which drives the electrical generator.

In some embodiments, the sheave has a diameter which is about 10% to about 30% the length of the blades.

In some embodiments, the sheave has a diameter which is about 5% to about 40% of the diameter of the turbine rotor.

In some embodiments, the wind turbine further comprises a gear box coupled to the electrical generator.

In some embodiments, the wind turbine, when floating, is moored so as to allow the plurality of floats and towers to yaw as one to orient the turbine rotor against the wind.

In some embodiments, the wind turbine, when floating, is adapted to allow the plurality of towers to yaw to orient the turbine rotor against the wind.

In some embodiments, the wind turbine comprises a mooring cable whose lower end is attached to an underwater mooring point, which, when under tension, points from the underwater mooring point to the hub or to a point in space within a distance from the hub which is less than about 20% of the length of the blades.

In some embodiments, the mooring cable, when under tension, has a slope of about 0.5:1 to about 3:1. In aspects of this embodiments, the mooring cable has a slope of about 1.5:1.

In some embodiments, the mooring cable is attached to an underwater mooring point and attached to the rotor axle.

In some embodiments, the mooring cable is held windward of the tower or floats by a standoff structure.

In some embodiments, the mooring cable is not attached to the rotor axle.

In some embodiments, yawing of the turbine rotor is the result of movement of the entire wind turbine.

In some embodiments, the towers are lattice towers.

In some embodiments, the wind turbine includes a plurality of floats, wherein the plurality of floats includes four floats configured in a square arrangement with a distance of about 30 meters to about 60 meters, the plurality of towers includes four lattice towers, each of the flour lattice towers attached to the top of one of the four floats, the four lattice towers sloping upward to structurally support the fixed rotor axle, each pair of diagonally opposite floats being rigidly connected.

In some embodiments, the wind turbine includes a plurality of floats, wherein the plurality of floats includes four floats with a distance between any two of the four floats of about 36 meters to about 72 meters, the plurality of towers includes four lattice towers, each of the flour lattice towers attached to the top of one of the four floats, the four lattice towers sloping upward to structurally support the fixed rotor axle, each pair of diagonally opposite floats being rigidly connected.

In some embodiments, the wind turbine comprises a) four rigidly interconnected floats configured in a rectangular arrangement with a perimeter of about 144 meters to about 288 meters; b) a turbine rotor, including a hub and a plurality of blades, each blade having a length between about 70 and 130 meters; c) four lattice towers, each of the four floats structurally connected on top to one of the four lattice towers, the four lattice towers sloping upwards to structurally support the turbine rotor positioned approximately above the centroid of the rectangular arrangement; d) a sheave connected to the turbine rotor to rotate with rotation of the turbine rotor, the sheave holding a belt coupled to a shaft of an electrical generator, the sheave having a diameter of about 10 to 40 meters; the electrical generator mounted closer to the floats than the turbine rotor.

In some embodiments, the wind turbine has a rated capacity of at least 10 MW and a draft of less than about 5 meter.

In some embodiments, the wind turbine, (i) comprises a) a plurality of floats and one or more connectors interconnecting the plurality of floats; b) a plurality of towers connected to the plurality of floats; c) a turbine rotor, including a hub and a plurality of blades, structurally supported by the plurality of towers, the turbine rotor coupled to an electrical generator; and d) a mooring cable attached to an underwater mooring point, which, when under tension, points from the underwater mooring point to the hub or to a point in space within a distance from the hub which is less than about 15% of the diameter of the turbine rotor, and with a slope of about 0.5:1 to about 3:1.

In some embodiments, the wind turbine includes a mooring cable, and the mooring cable is attached at the rotor axle, a tower near the rotor axle, or a standoff structure above or below the water surface.

In embodiments, the wind turbine includes a mooring cable attached to a standoff structure. In aspects of this embodiment, the standoff structure extends beyond the area defined between the floats.

In some embodiments, a position along the upper length of the mooring cable is connected to the wind turbine at a position below 40% of the height of the hub. As used herein, "mooring cable is connected" refers to a connection adapted for the wind forces expected during operation of the wind turbine.

In some embodiments, the mooring cable is attached to an underwater mooring point and attached to the hub.

In some embodiments, the mooring cable is held windward of the base by a standoff structure.

In some embodiments, the mooring cable is (i) not attached to the hub, and/or (ii) attached to a structure of the wind turbine within 10 m of water level.

In some embodiments, the yawing of the turbine rotor is the result of movement of the entire wind turbine.

In some embodiments, the wind turbine has a rated capacity of at least about 1 MW and a draft of less than about 1 meter per 1 MW of rated capacity.

In some embodiments, the wind turbine is characterized by a natural frequency in heave exceeding 0.2 Hz when mooring lines have been removed.

In some embodiments, electric power generated by the wind turbine is used to produce ammonia, hydrogen, liquid fuels, reduced metals, or distilled water at a nearby floating plant.

In some embodiments, the wind turbine comprises a single mooring cable of controlled slope to prevent wind induced pitch while permitting rising with the tide, and yawing to follow the wind.

In some embodiments, the wind turbine comprises a first mooring cable and a second mooring cable, both mooring cables attached underwater along their bottom lengths at a single underwater mooring point, the first mooring cable attached along its top length to a first standoff structure at a first connection point, the second mooring cable attached along its top length to a second standoff structure at a second connection point, the rotor being positioned vertically above a rotor point at water level, and the rotor point being between a first line, defined by the first underwater mooring point and the first connection point, and a second line, defined by the second underwater mooring point and the second connection point. In aspects of this embodiment, the first standoff structure and the second standoff structure are the same structure. In a further aspect, the first and/or second mooring cable can be controlled in their lengths, and controlling the lengths changes the wind turbine yaw.

In some embodiments, the wind turbine comprises a single mooring rope, wherein the mooring rope is a neutrally buoyant synthetic rope to prevent catenary sag and compliance.

Another mooring option is to use a buoy fixed in position at the surface, and a rotational connection of the turbine standoff to that fixed point, wherein the connection has a sloped or slanted freedom to move up and down with wind turbine rise due to, for example, waves. For example, a slanted tube, or a rod with a wheeled carriage, such that the rod or tube normal points at or near the rotor center, provides the proper mooring force direction.

In some embodiments, the wind turbine has substantially no ballast.

In some embodiments, the wind turbine further comprises one or more pressure wheels on a belt carried by a sheave to permit reducing belt tension without causing slip.

In some embodiments, the wind turbine further comprising a water source controlled to allow for water flooding of driven sheave during overload to prevent slip damage.

In some embodiments, the turbine rotor has a rotor axle extending through the hub which is structurally supported by the towers at both ends of the rotor axle.

In some embodiments, at least one tower is downwind and one tower is upwind.

An further embodiment is a shallow draft, wide-base floating wind turbine without nacelle, secured by a properly sloped anti-pitch mooring line, and transmitting power to base with a step-up belt drive.

A further embodiment is a floating wind turbine supported on at least three, approximately equi-axed floats with rigid interconnection, with draft in no-wind conditions less than 1.0 times float diameter or equivalent diameter (D-float or sqrt(A-float)), where A-float is measured at the waterline.

A further embodiment is a floating wind turbine with at least one tower leg upwind of the rotor, at least one tower leg downwind of the rotor, wherein each tower leg is supported on a distinct equiaxed float, where the leg-support floats have no-wind draft less then 1.0 sqrt(A-float). In an aspect of this embodiment, the wind turbine does not have a nacelle.

In some embodiments, one or more equal-altitude-angle mooring lines from a single fixed mooring point have a mean direction which aims near the rotor center. In an aspect of these embodiments, the one or more mooring lines are connected to the turbine structure within ⅓ of hub height from water surface.

In some embodiments, mooring of the wind turbine is to a heavy SPM surface buoy via a sloped low-friction interface which constrains mooring force direction to aim at the rotor.

Well known quick connect technology for the rope and electrical cable can be used to permit floating turbine swap out in a few hours, for convenient and safe in-port maintenance without interruption of power production.

In some embodiments, the wind turbine has a draft in meters which is less than three times the square root of the rated capacity in MW.

In some embodiments, the wind turbine has a draft which is less than 2.5 times the square root of the rated capacity.

In some embodiments, the wind turbine has a draft which is less than 2.0 times the square root of the rated capacity.

A further embodiment is a floating turbine with draft less than 2*sqrt(rated capacity) with a standoff upwind ballast system comprising struts to a floating base and one or more tensile element to the top of the tower, supporting a water-containing vessel (e.g., such as a fabric bladder or vertical thinwall capped steel tube or cone).

A further embodiment is a wind turbine with rated power exceeding 0.1 MW with natural frequency in heave (Hertz) that is greater than 0.3*(1/MW)^0.25.

In some embodiments, the wind turbine has a rated power exceeding 0.1 MW and a natural frequency in heave (Hertz) that is greater than 0.3*(1/MW)^0.25.

A further embodiment is a floating wind turbine, comprising a rotor but no nacelle, at least one supporting tower upwind of the rotor and at least one supporting tower downwind of the rotor.

A further embodiment is a wind turbine, comprising a plurality of low-draft floats rigidly connected to form a floating island, wherein the floating island has a width that carries a spread-leg tower supporting a turbine rotor. In an aspect of this embodiment, the wind turbine has a single mooring rope from a single mooring point, not pointing toward the rotor center.

A further embodiment is a wind turbine having a light multi-float shallow draft platform, with a spread base tower, and a rope connection point upwind of the turbine. In an aspect of this embodiment, the wind turbine further comprises a tank connected to a standoff with compressive strength, with a tension member (e.g., rope) from the standoff to the top of the tower. In aspects of this embodiment, the tank can be filled or emptied by pumps, or by removing or injecting air above an open-bottom water column, possibly in connection with wave pressures raising and lowering the water level in the tank.

If a single mooring rope or multiple mooring ropes attach to the underside center of the floating island, wind yawing (automatic aiming) of the turbine will typically not occur. And ballast may be needed. But the island could be rotated, for example, with the use of propeller thrusters.

If dual mooring ropes from a single mooring point attach to two points on the island, the island will always 'face' the mooring point. Adjustable ballast could still be needed. But if the waves affect the turbine position, it may not accurately face the wind. Then the island orientation could be altered to precisely face the wind by adjusting the lengths of the two cables.

Multi-line mooring may also prevent island rotation. That is, multiple lines to multiple attachment points. There could be three somewhat slack ropes from three anchors, and the wind would pull one or two tight. (Or there could be multiple heavy catenary chains from points around the island.) If the ropes do not point toward the rotor, then ballast may or may not be needed. In order to adjust yaw to maintain turbine alignment with the wind, either the mooring rope attachment points could be on carriages that are motor-moved around the island, in effect rotating the island relative to the anchors. Or the towers could sit on wheels (like a land embodiment) so the tower can be motor-rotated on a circular rail on the island. Any ballast would also have to rotate with the tower.

Exemplary embodiments and aspects of the disclosed wind turbines further are (1) a mooring system, (2) a mechanical drive system from rotor to generator, (3) a light weight tubular hub and axle, (4) needle bearings for rotor turning, (5) needle bearings for blade pitch, (6) a rapid blade-pitch mechanism without electric or hydraulic actuator, (7) lattice towers that diverge to a wide base, (8) craneless erection on unimproved soil, followed by air-cushion launch into shallow water, (9) multifunctional turbine floats, and (10) control of wave-driven resonant motion in the water, and are described in the following. Suggested dimensions relate to a 10 MW rotor as devised for the DTU (Danish Technical University) reference turbine.

These embodiments and aspects of the wind turbine are can also be advantageous on land. For example, the above (3), (4), (5), and (6). (2), (7) and (8) can be employed if a land turbine has the space to mount four legs to a circular rail. Crane-less erection on land (as described below) can also be advantageous. Such an embodiment would have no foundation, a cheaper and easily transported and erected tower, the resulting cheaper hub and axle, and a cheaper and overload tolerant belt drive.

Mooring System, Including Cable-Free

The use of an angled mooring force aimed at the rotor center can provide a number of advantages. FIG. 1, FIG. 2, FIG. 3 and FIG. 4 each illustrate a submerged mooring line held by a mooring standoff with a collinear tension brace connected to the fixed axle of the turbine rotor. The angled mooring line, aimed at the rotor center, can be connected at or near the rotor center, or connected somewhat away from the rotor center, for example between 30 m below and 30 m above the waterline. The intended effect can be achieved, for example, with a two-part line, one connected to the structure of the wind turbine including the floats, connectors between the floats and any mooring standoff, which provides a platform for the towers, turbine rotor and generator) to moor the turbine, and a collinear brace from the line connection point to a non-rotating point near the rotor center. While the slope can vary, a slope of about 1.5 is economically beneficial and provides a good tradeoff between distance from anchor point, versus downpull on floating turbine requiring additional buoyancy. Whereas a slope of about 0.5 reduces fore-aft surge motion from wave lift, but requires either a much longer standoff, or leaves the cable moving about freely in air.

With a single mooring line, the path of the line defines the direction and line of action of the mooring force. Accordingly, the mooring line typically aims at or in the vicinity of the rotor center. In case of a SPM buoy (a single point mooring), this typically exerts only horizontal force, not aimed at the rotor center. To rectify this defect, the connection point of the turbine can be attached to a carriage on the SPM buoy, that slides up and down a sloped track. The line perpendicular to the track is the mooring force. So the track could have a slope of −0.67, then the mooring force could have a slope of −1/(−0.67)=1.5, pointing at the rotor center.

Figure 2:
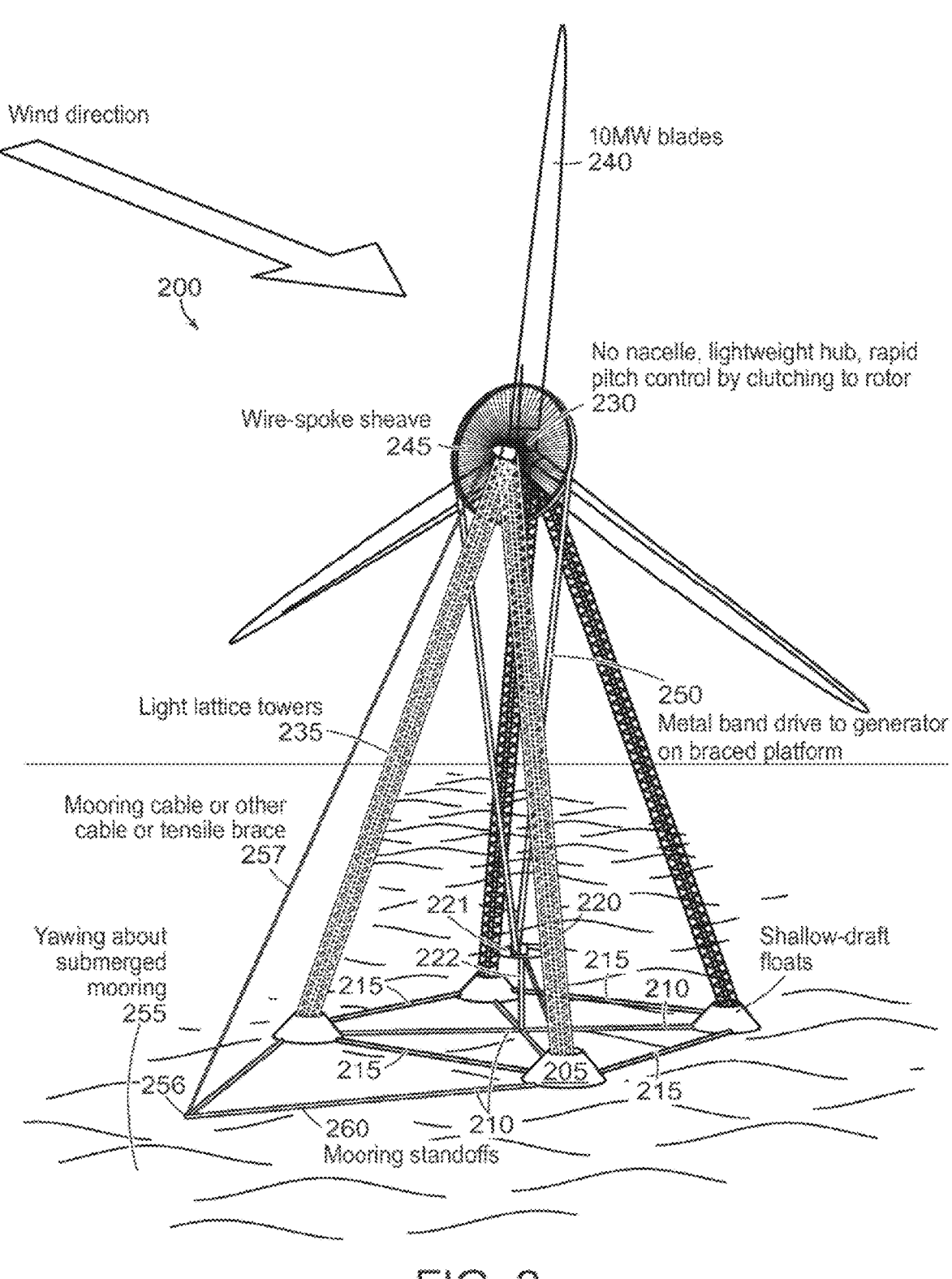
FIG. 2 provides an illustration of an embodiment of a 10 MW rated capacity wind turbine suitable for offshore application, when floating on water.
Figure 3:
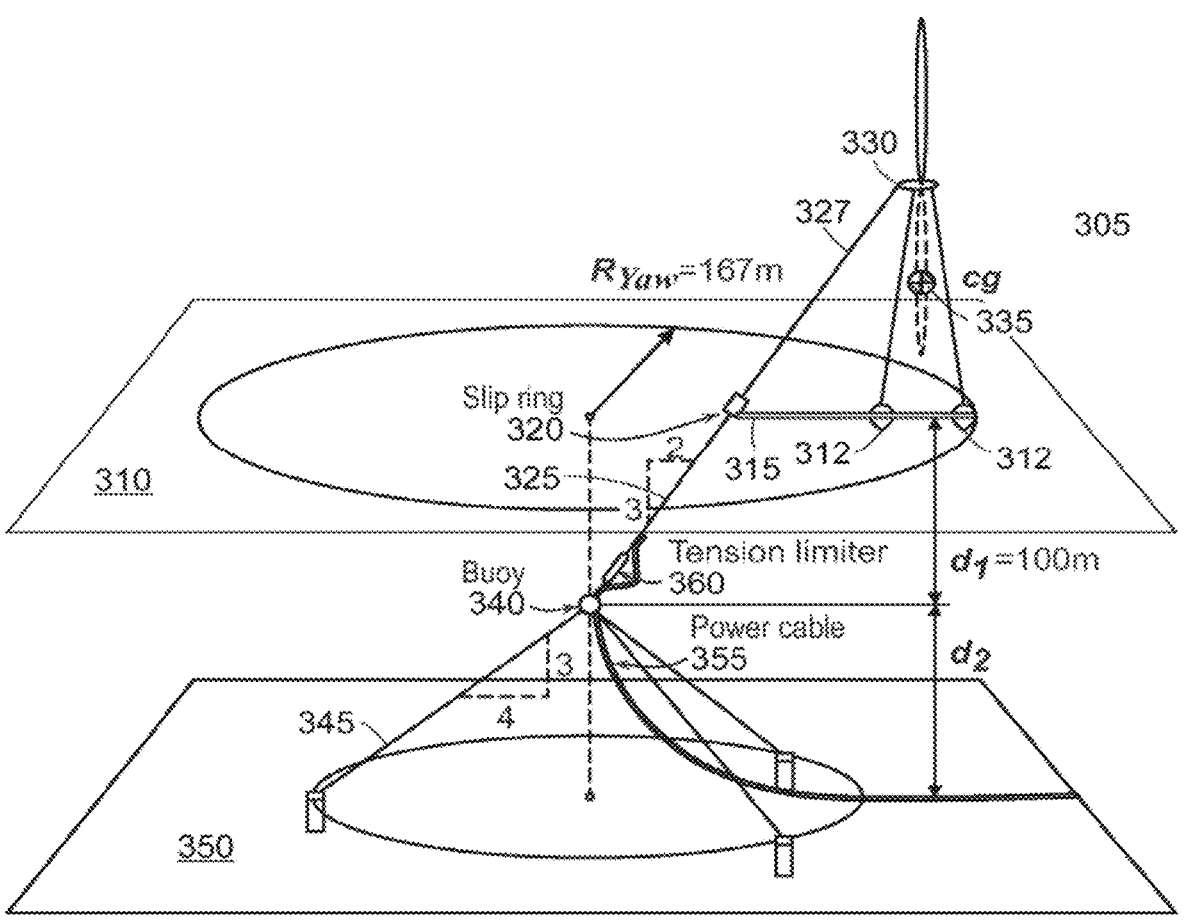
FIG. 3 provides a schematic view of an embodiment of a wind turbine, when floating on water, and illustrating the use of a mooring line to facilitate wind-following yawing of the wind turbine; in deep (e.g., >300 m) water as illustrated here, three mooring anchors position an underwater mooring buoy, in less deep water a single anchor suited to omnidirectional pull is appropriate.

FIG. 3 provides a schematic view of a wind turbine 305 of an embodiment described herein (e.g., the floating wind turbine of FIG. 1 or FIG. 2) floating on water 310. In this schematic cross-sectional view, only two floats 312 (here, of approximately bifrustum shape (e.g., here, truncated top cone connected to bottom cone)). The wind turbine 305 includes a mooring standoff 315 providing a suitable standoff distance (i.e., distance from a turbine structure attachment point (e.g., slip ring 320), where a mooring line or cable 325 is held or connected (here, held by confinement to the slip ring 320 opening) to the mooring standoff 315, to near the fixed axle 330 of the wind turbine 305, approximately above the center of gravity (cg) 335 of the wind turbine 305. 327 is a collinear brace transmitting mooring force to (or near) the rotor axle. 327 can be a continuation of mooring cable 325 (i.e., one single cable extending from 340 to 330) The slope of the mooring line 325 (here, 1.5:1 (illustrated with rise 3 divided by run 2)) from a point underwater 340 (e.g., a buoy or a seafloor point if the water is <300 m deep) where the mooring line is held or attached, to the attachment point (e.g. slip ring 320) is determined by the length of the mooring line 325 from point 340 to point 320. For a given depth of point 340 in the water, the length of the mooring cable determines a yaw radius (e.g., here illustrated as $R_{yaw}$=167 m). When the mooring line 325 extends all the way to the hub 330 (not illustrated here, where a rotary junction with slip ring conveys mooring force from cable 325 to cable 327), typically, the length of the mooring line and the standoff distance is chosen such that the slope of the mooring line is about the same below and above the attachment point 320. FIG. 3 further illustrates that the underwater buoy 340 can be held in place by three or more (here, three) lines or cables 345 attached/anchored to the sea floor 350. When power generated by the wind turbine needs to be transmitted, a power cable 355 for this transmission can be placed and attached along the mooring standoff 315 and along the mooring line 325 from about the location of the mooring holding point 320 to the buoy 340 to then reach the seafloor 350. A tension limiter 360 can optionally be used, to prevent damage from a moving turbine being brought up short by a suddenly-taut mooring cable.

Figure 4:
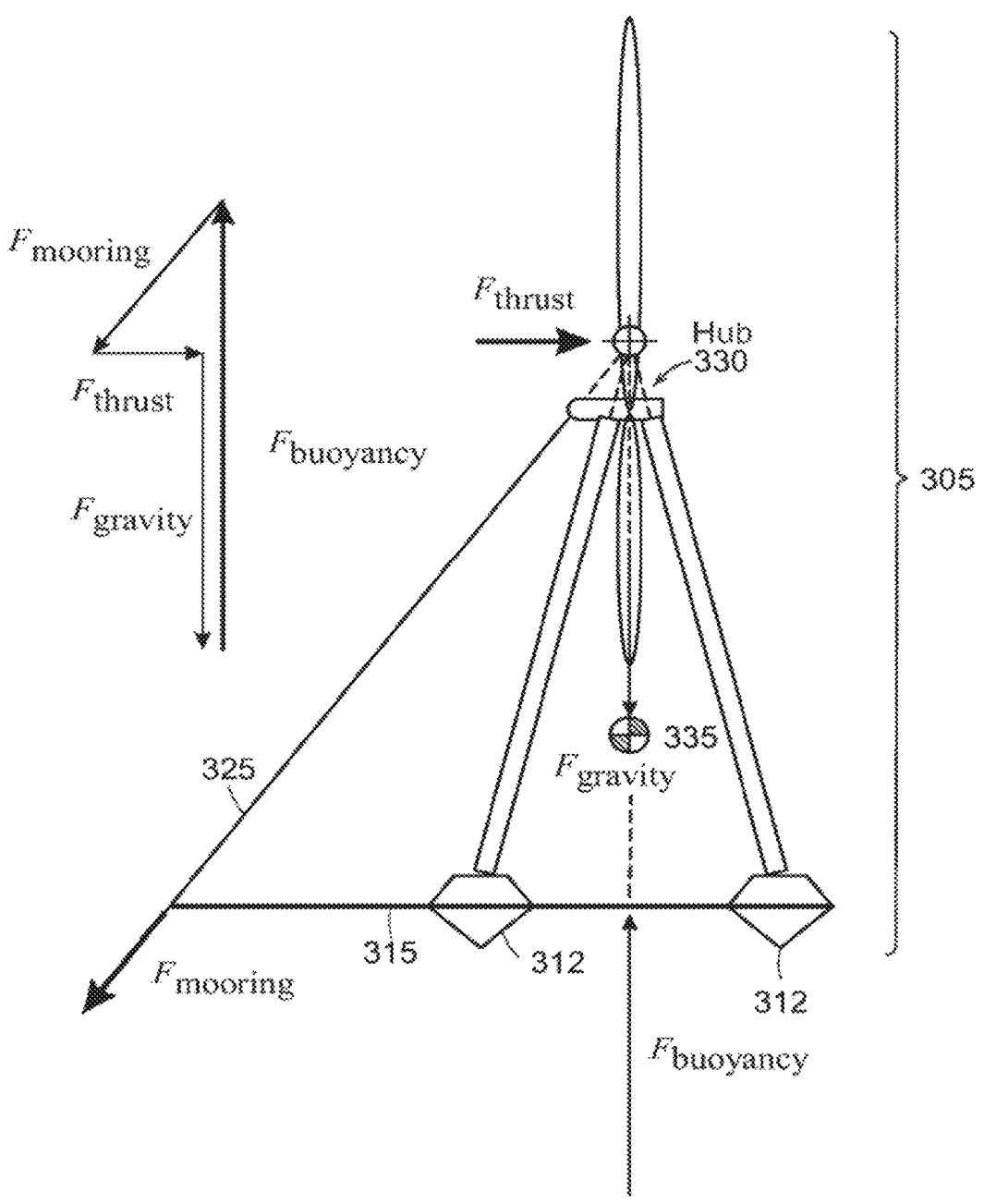
FIG. 4 illustrates force vectors for the wind turbine in FIG. 3, specifically, of the mooring force, thrust, buoyancy, and gravity. It shows that a mooring line directed at a common center of force results in buoyant support with a fixed line of action, hence no turbine pitch; and that the towers are then loaded purely vertically.

FIG. 4 illustrates force vectors for the wind turbine in FIG. 3, specifically of the mooring force $F_{mooring}$, thrust $F_{thrust}$, buoyancy $F_{buoyancy}$, and gravity $F_{gravity}$. These force vectors will typically need to be considered for any floating wind turbine. If Fb and Fg are vertically aligned, then Fm must point at the intersection of Fb+Fg and Ft. This will occur without any pitch if Fm already points at the rotor center in the case of small Ft.

The best way to control mooring line force angle is to employ neutrally buoyant lines, which pass straight from an anchor point to the turbine attachment point. (A steel line or chain would require floats to remain straight at small tensions.) If there is a water current impinging on the line, freely rotatable light plastic shrouds (streamline covers) can be used that will align to the current, cutting drag by a factor of 10 or so to minimize current force tending to displace and curve the cable.

The sloped mooring force need not be produced by a sloped rope extending downwards and away from the hull. If a Single Point Mooring (SPM) structure has been provided at the water surface, its interaction with the turbine can be via a non-vertical attachment guide, so the force on the turbine has the desired altitude slope. For example, a roller on the float, interacting with a slanted rod on the turbine structure, or vice versa, will produce a mooring force aimed in the vicinity of the rotor center. Various other geometric or linkage arrangements can also be used to control the mooring force direction at the attachment point.

If single or double angled mooring lines are used, which is an easy way to control the mooring force direction, their length must be considered. If very short (for example, 10 m) then heave of the turbine will change the line angle a lot. Connected to the rotor hub this would not matter, but connected to the hull it will mean some wind-induced pitch of the turbine. The short-line case, for example, in the case of shallow water, is a good application for the above-mentioned slanted rod or equivalent.

Normally the force vector variation due to turbine heave is minimized by making the line longer than, for example, 50 m. But if it ends up very long (in deep water), at a shift in wind direction the turbine has to travel a large distance around the watch circle, so realignment is slow. Additionally, the distances between wind turbines would be large to ensure that wind turbines do not hit each other during realignment. Accordingly, when water is deep, mooring the turbine to a subsurface buoy, tethered in a fixed location, for example, by three converging anchor lines, as shown in FIG. 3, is preferred. This reduces the radius of the circle traveled by the turbine (i.e., the yawing radius), however it adds the cost of additional anchors and the buoy; and it impedes fishing over a greater area. Thus, typically, the single-line lengths (attaching to a hull or mooring-standoff) will be between 30 m and 300 m, with a three-line buoy only if necessary in deeper water.

In embodiments where the wind turbine includes a mooring line, needed additional features are "mooring line overload fuse", and "mooring line twist prevention" (particularly in relation to the electric power cable) (See FIG. 3 which illustrates a power cable 355 positioned along part of the path of the mooring line).

Overload Fuse

The mooring overload fuse is related to the potential impact damage of a straight line, if the turbine surges toward, then away from, the anchor or mooring point (due to waves, in light wind). The line will slacken, then after the turbine reverses direction the line will suddenly become straight and stiff, resulting in a high-force impact. This could damage the line, damage the hull, or unseat the anchor. It is one of the reasons for using expensive curved catenary chains. For a horizontal wind thrust of, for example, 200 MT the sloped mooring line will experience a steady tension (360 MT) which is proportional. Anchors and lines can be sized for double or triple that, in case they degrade over time. High impact force can be reduced or prevented by capping the tension with an overload fuse set to roughly 120% of expected steady tension (440 MT).

A reversible force limiter (e.g., tension limiter 360 in FIG. 3) can be, for example, a collapsed piston-in-cylinder, installed in line with the mooring cable, and held compressed by the water pressure at its installation depth. For example, at 100 m depth a 2.4 m-diameter piston in a tube will move toward the open end only if pulled with a cable force of about 440 MT. The cable force must balance hydrostatic pressure on one end of the piston, minus water vapor-pressure at the other end. Equivalently, a bundle of four 1.2 m-diameter tubes can be employed. The needed displacement to absorb likely turbine kinetic energy is around 1 m, with an additional 2 m useful for guiding a long piston. This tube can be steel or concrete, with only the wall thickness to prevent buckling from external pressure. The piston must be long enough or include roller guides to prevent tipping/jamming. The chamber can be sealed by a rolling diaphragm or an O-ring seal or lip seal. Fluid leakage can be tolerated if a pump or a spring return of the piston can clear accumulated fluid ingress from time to time. Note that the force-limiting function can be enhanced if the device can also dissipate stored energy. As an example, the displaced-piston stored energy can be dissipated by admitting water into the empty space. Slowly pumping that water out would reset the system.

When installed in deeper water, such an overload fuse can be made of a smaller diameter, e.g., 400 m depth would allow just 1.2 m diameter.

Another way to achieve overload fusing is to employ re-usable axially loaded buckling rods. Important characteristics include axial near-rigidity until the buckling load, then axial shortening at virtually constant force, until bending failure. Unlike a force limiter based on a linear spring, there is no need to use any of the strain-energy capacity to react the working tension. The amount of needed material (typically less than 500 kg) is found by equating energy to be stored, with maximum bending energy of a bar. (Note that fiberglass is a preferred choice because it does not corrode, and stores more energy per volume than any metal.) The dimensions are selected so it buckles at the desired protective load. One practical way to employ one or more such bars is to connect the bar in line with the mooring cable, then flip it end for end so the cable tensions place it in compression. For stability, the cables must pass through guide eyes at the bar ends.

Buckling rods as suggested here can be used in diverse ways to achieve desired force characteristics. For example, making a square of cables, a buckling rod can be installed as a transverse diagonal, and this assembly will show post-buckling stiffening as the axial diagonal is stretched. Also, placing a cable or axial spring in parallel with such a buckling bar can limit its compression, or provide a desired constant stiffness.

Preventing Cable Twist

Since typically the generator is meant to deliver electrical power to a power cable on the seafloor, twisting damage is a concern. If the turbine swings around its mooring to follow the changing direction of the wind, there is a possibility that it can wind clockwise more than counterclockwise (though this might take days or weeks), and eventually damage the electric cable. There are several possible ways to reduce or eliminate the risk of cable damage. For example, one method includes measuring the wind speed and determining or predicting a time when the wind completely switches direction (i.e., to a wind direction which will cause the wind turbine to move to a position opposite to the prior direction), which typically provides a time window of very small wind velocity. During that time window, applying a small bias will cause the turbine to rotate in either desired sense (cw or ccw). That bias can be provided, for example, by pre-rotating (using individual pitch control of the rotor blades, or pushing with a few small outboard motors) as the wind dies off. Alternatively, or additionally, the method of power production using a wind turbine described herein, includes a temporary break from power production, and during the break, parking and feathering the turbine rotor for minimum thrust, and using one or more water propellers to move the wind turbine along the watch circle in a determined direction (e.g., determined by a method that includes keeping track of the movement of the wind turbine around the watch circle over time) to untwist the entire floating structure one or two rotations. Another option is to mount a rotary joint or slip ring where the mooring cable joins the hull (e.g. at a mooring standoff), preferably above the water level for easy access and to prevent water ingress. To keep the mooring cable and festooned wire twist free, a heavy duty thrust bearing can support the mooring force, and a slow, high torque alignment motor can be used to rotate it properly relative to the hull to keep it twist free. The same housing can contain electrical brushes or mercury slip rings suited to the current. It can be oil-filled to inhibit corrosion or electric arcing.

Wind Turbines Without Mooring and/or Electric Cables

The original offshore turbines were mounted on foundations sitting on, or buried into, the (shallow) seafloor. Floating wind turbines have occasionally been deployed in deeper waters, exchanging costly tower and foundation capabilities for even more expensive moored floating platforms. In addition, all current offshore wind turbines are used to generate electricity for onshore use, employing expensive undersea electric cables and grid connections to deliver the power to land.

Alternatively, floating wind turbines can be used that (a) dispense with the anchors and mooring cables and/or (b) dispense with the electric connection. While options (a) and (b) can be used independently, use of both options together is advantageous.

A floating turbine can hold a fixed location despite the wind pressure acting on the rotor, by providing a large underwater 'station-keeping' thruster, for example, a large water propeller. Such a device must resist the very large rotor wind force of approximately 150 MT, which requires it to have a large diameter as explained below. It must also react the lesser (but potentially off-axis) wave forces: this calls for some directionality such as a thrust-steering vane or directional propeller. Accordingly, in some embodiments, the wind turbines described herein have one or more thrusters.

In embodiments, the wind turbine disclosed herein are a station-keeping floating wind turbine with one or more water thrusters having a diameter exceeding 15% of the turbine rotor diameter.

With the turbine at one fixed position (not moving) the rotor force and water-propeller force have the same magnitude F. The power taken from the wind is proportional to F*Vwind and the power delivered to the water is proportional to F*Vwater, where Vwater is the fluid motion created by the propeller. Thus the fraction of power lost is (Vwater/Vwind).

That velocity ratio can be estimated from the force balance:

$$(\rho wind/2)*Awind*(Vwind)^2 \sim (\rho water/2)*Awater*(Vwater)^2 \text{ where } \rho = density, A = rotor \text{ area}$$

This implies that $(Vwater/Vwind) \sim sqrt[(\rho wind*Awind)/(\rho water*Awater)]$ For each rotor A is proportional to $R^2$, while $sqrt(\rho wind/\rho water) = 0.035$ Therefore the fraction of generated power devoted to station keeping is 0.035*(Rwind/Rwater).

If Rwater=Rwind/6 (e.g., Rwater=90 m/6=15 m), this means 0.035*6=0.21 or 21% losses. A larger water propeller can reduce the losses to about 15% or even about 10%. This might be cost-ineffective for a conventional shallow depth offshore wind farm, but when water depth is much greater (which would require expensive mooring) it can be cost-effective.

Station keeping (which also implies self-propulsion) can be particularly advantageous if grid-connected electricity is no longer produced. If the wind power can provide other valuable goods, it seems possible that the turbine could be allowed to work in international waters, with minimum permitting or planning, moving periodically to locations with optimum wind, and also avoiding storms.

Various known power-requiring processes can be considered, like purifying salt water, or splitting water to capture hydrogen. But the most attractive high density products would be liquid or solid fuels. For example, electrolytic hydrogen and liquefied atmospheric carbon dioxide can be processed into synthesis gas (SYNGAS). With that precursor a liquid crude-oil substitute (e-crude, useful for plastics or fuel production) can be synthesized, apparently about 25,000 barrels (bbl) of green fuel per year from 10 MW electric power. The big advantage of a liquid product is that a towable bladder can be filled over the course of a month, and several bladders can be towed to shore every few months. In embodiments, the wind turbines described herein have no mooring but a propeller for station keeping, and the wind turbines include or are moored adjacent to devices to convert generated electricity or shaft work into chemical energy (e.g., in the form of synthesized compounds such as liquid or solid fuels, hydrogen, or ammonia) or compressed gas stored at depth to await later expansion.

Ammonia is another valuable product (both a fuel and a fertilizer) that might be synthesized, from electrolytic hydrogen and atmospheric nitrogen. It can be liquefied at reasonable pressures for easy transport In embodiments where the floating wind turbine is adapted for station keeping, the water propeller can be powered mechanically (for example by a belt from the generator axis to the propeller axis). However, the mooring force is then no longer directed at the rotor axis as is needed to prevent pitch from wind thrust. Tipping the propeller to provide that sloped force would be highly inefficient (its thrust would have to be much bigger than the horizontal wind force). To balance the overturning couple formed by wind thrust and water thrust, the simplest step is to provide some upwind ballast. For example, the tip of the standoffs where the mooring line is typically attached is approximately 80 m in front of the 120 m high rotor axis, and would balance the overturning wind moment with a weight of 225 MT, i.e. about (6 m)^3 of water. A water-holding steel or concrete tube of 7 m diameter and 6 m height above the water plus 3 m below provides that weight, or even more if the wind pushes extra hard. It can either be used full at all times (in which case, at low wind thrust the turbine is modestly pitched), or it can be adjusted in weight to match conditions, either by a pump or by valving air in or out during wave motion.

A floating turbine can hold itself in place, and resist pitching from wind force, at a cost of less than 20% of produced power. By adopting this design choice, the expense of anchoring (and possibly also leasing/permitting) can be avoided.

The Mechanical Drive System

A conventional wind turbine rotor rotates around a slender tower to align with the wind, with its gear transmission and generator in an enclosed nacelle. A wind turbine with no nacelle as described herein can yaw the entire tower and its floats to orient the rotor (the tower can be broad for efficient connection to the floats), and the generator can be placed on a structural support, typically, protected from water. In these cases, a speed-increasing mechanical power transmission can power the generator, without a complex gearbox which in conventional designs is an expensive and unreliable component housed by the nacelle in proximity to the rotor axis.

In embodiments, the wind turbines described herein include a mechanical transmission which comprises a large diameter sheave connected to the turbine rotor, a belt carried by the sheave, and a small diameter sheave (or belt drum) mechanically coupled to the shaft of the electrical generator. A mechanical transmission can be lightened and its stages reduced if the input gear or sheave can be large-diameter. A sheave or gear can be used that is far larger than any conventional nacelle, for example, between 15 m and 40 m in diameter (see, e.g., FIGS. 1, 2, and 5).

Figure 5:
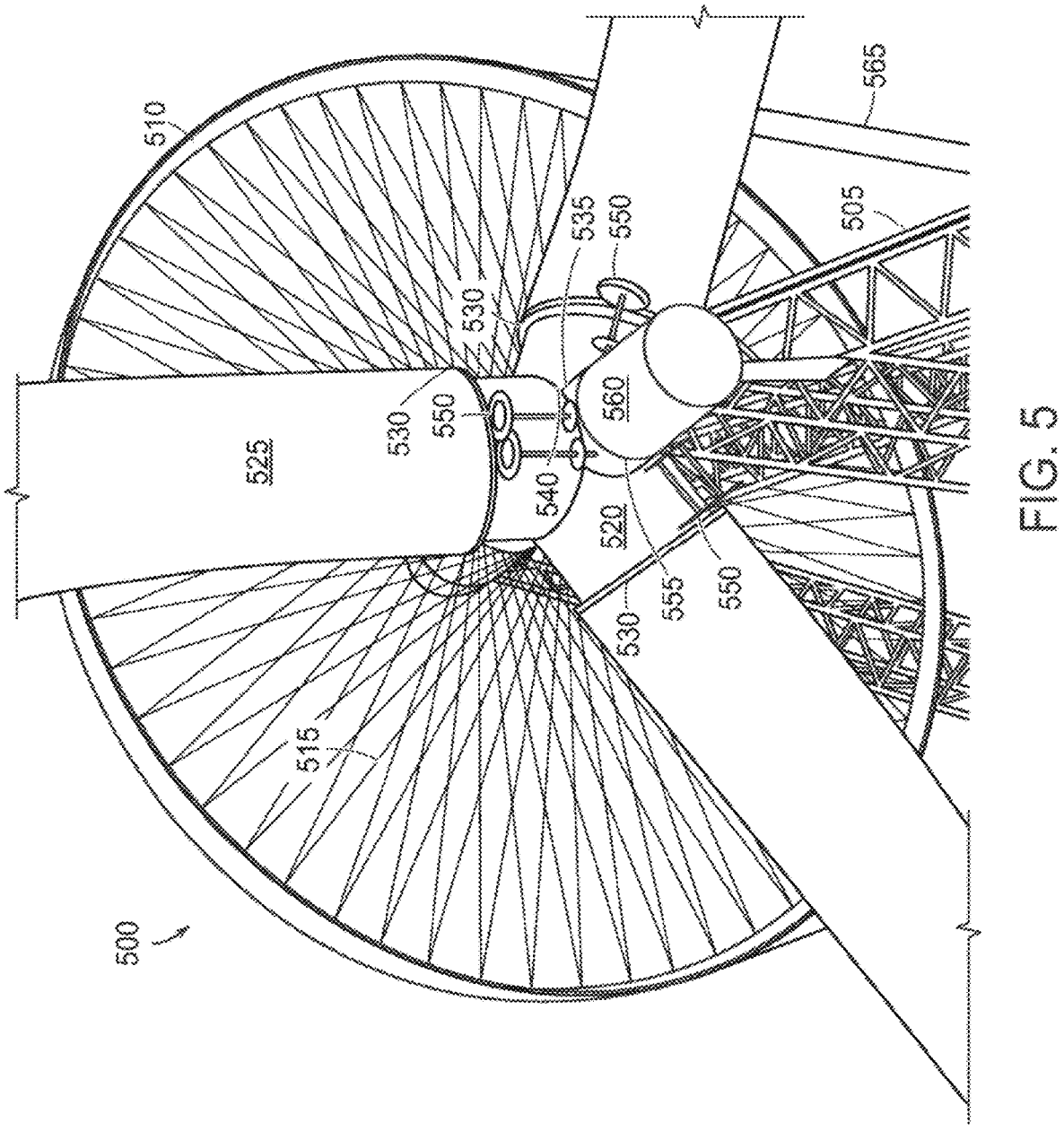
FIG. 5 shows an embodiment of the connection between lattice towers and a rotor axle supported at both ends, of a wind turbine of the present disclosure.

FIG. 5 shows the top part 500 of a wind turbine (e.g., of a wind turbine of FIG. 1 or FIG. 2). Only the top parts of the four lattice towers 505 are illustrated, with two towers supporting each end of the fixed tubular axle. A belt sheave 510 (here, e.g., 30 m in diameter) is braced and driven by a plurality of wire spokes 515 from a rotating hub 520. In addition to the rotating hub 520 and the belt sheave 510, the turbine rotor includes three blades 525 (each only shown where it connects to the hub 520), three blade ring gears 530 (one per blade) for individual blade pitch, integral with segmented blade slewing rings, blade pitch input bevel gear 535 and blade pitch reversing gears 540 which drive contra-rotating power shafts to pitch each blade, blade pitch air clutches 550 which connect either power shaft to its pitch drive pinion, and a large bevel gear 555 fixed to the non-rotating rotor axle 560 which extends through the bore of the hub 520. The sheave 510 carries a hard stainless steel drive band 565 (i.e., an example of a belt; weather shroud not shown). Reversing gears 540 are on top of blade pitch input bevel gears 535.

For wind turbines with high rated capacity and accordingly large turbine rotor diameter (e.g., diameters substantially larger than 30 meters, e.g., 80 m to 250 m) it is uneconomical to install a gear, sheave, or magnets/coils near the blade tips.

A simple belt (or drive) to manufacture is a 301 stainless fully hard steel band, welded then ground down along a shallow bias cut to make a continuous belt. In line with the previous paragraph, a rather light large sheave (e.g., about 30 m in diameter) would drive the belt, which would turn a smaller diameter (e.g., 1 m) drum on the generator with substantial speedup (e.g., 30:1). Properly aligned hard steel belts are known to be extremely efficient, and the cost of this system are projected to be very low. It has to be sized so that the combination of bending around the small drum, and tension difference between slack and tight sides, do not cause fatigue. This can be determined using a Goodman rule, applied to full hard 301 stainless of about 1 mm thickness and 2 m width.

In case the generator locks up and the belt slips on that drum, it will heat up and reduce its hard temper. An instant of slip should not be so damaging as long as the belt keeps moving to distribute the heat input; and severe heating can be prevented by immediate water flooding. Water is a coolant, but more importantly as a lubricating film it will let the belt slip with almost no heat generation. In embodiments, the wind turbine includes a source of water which can be controlled to bring the belt in contact with the water for cooling and lubricating purposes.

One of the concerns is transmitting torque by friction, without needing high belt tensions. This is possible if friction coefficient is adequate, but there is always a risk that months of use could burnish the surfaces and reduce the friction coefficient. A solution is pinch rollers although special coatings (rubber, ceramic) can also be used on the belt or drum. If fully inflated truck tires are used to press the belt to the drum, non-slipping drive is possible even with a low coefficient of friction. Despite their rolling resistance, truck tires are preferable to a hard pinch roller because the applied force is spread out resulting in lower belt pressure.

In case the metal belt displays an unexpected vibration or durability problem, there are other reasonable options for gaining most of its advantages:

In embodiments, the wind turbine includes a rope drive. The steel and synthetic ropes used in deep elevators can also be suitable for driving a deck-level generator. If a turbine rotor included a ring at the blade tips a single high-speed rope can be sufficient. But a 3-blade rotor would end up a lot more expensive if it required a sufficiently strong circumferential ring. Using instead a 15 m radius sheave, multiple ropes (with attendant cost and practical disadvantages) would be needed. This is because twisted or braided ropes have poor fatigue behavior, and therefore have to be used at very low axial and bending stress.

In embodiments, the wind turbine includes a mine-conveyor belt as part of a mechanical drive system. A mine-conveyor belt is a useful component where many thin wire ropes or strong fabrics are unitized by rubber in a protected wide sheet. It would be a more practical way to handle a dozen or more ropes.

In embodiments, the wind turbine includes a bevel gear shaft drive as part of the mechanical drive system. It is advantageous to avoid the cost, fragility, inefficiency and maintenance needs of precision gearing, which could alternatively be used despite the high cost. Some of the advantages can be achieved by using a very large input gear, much bigger in radius than the conventional nacelle. The efficiency is highest when the number of gear meshes is least, so a preferred approach is a very large input bevel gear, driving a small bevel gear on a long vertical tube, braced against whirl. This is the layout of a manual eggbeater or hand-crank drill. Possibly the step-up ratio would be supplemented by small deck-level 3:1 gear drive or industrial belt drive at the generator. For best manufacturability (and cost) the large gear can be designed for construction in small pieces, similar to proposed segmental blade pitch bearings. High hardness commodity steel plate can be roughed out by waterjet, then precision machined by CNC into identical sub-parts to be pinned, bolted, and possibly also bonded or soldered, into a precise assembly when the turbine is erected.

Light Weight Hub and Axle

A conventional wind turbine axle is solid, and the rotor is cantilevered from one end. A conventional blade-mounting hub is a massive casting, which seemingly has not been designed to work in membrane stress but rather is thickened to tolerate local bending stress.

It can be desirable to fabricate the hub so blade-root bending moments are taken primarily by membrane stresses. Then large-diameter steel tubes with small (e.g., sub-inch) wall thickness, can be manufactured near the assembly dock, and could reduce weight by a factor of 3 or more.

Figure 6:
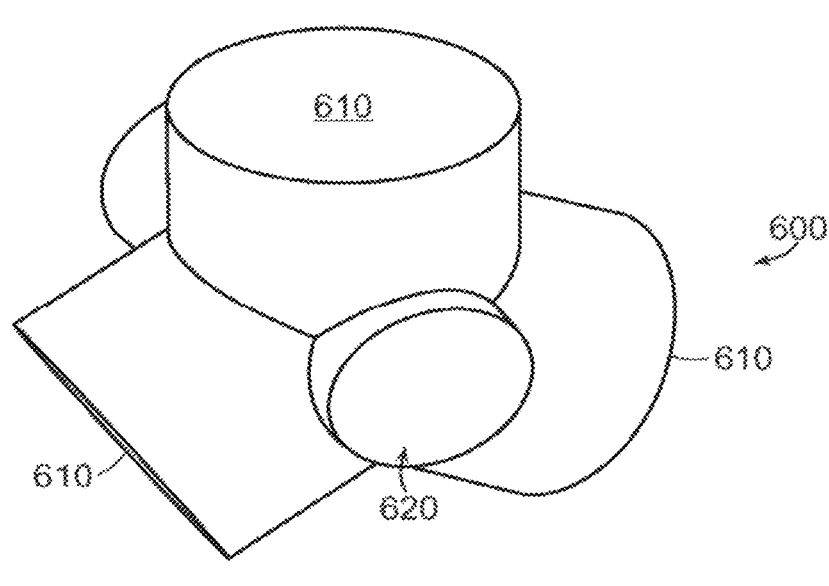
FIG. 6 illustrates an embodiment of a hub where three blade mounts join to a bore tube that will revolve about an axle fixed to the towers.

When a blade transmits a bending moment to its support, this is reacted by membrane stresses if the blade is attached to a same-diameter tube, which is incorporated into the hub. The principle of joining thinwall structures is that any place where tangents are not aligned should have a third-direction surface (a diaphragm) all along that joint. And joint fillets should be generous. FIG. 6 illustrates an example of a hub 600 where three blade mounts 610 join to bore tube 620. Internal diaphragms are placed on the symmetry planes between blade mounts.

Figure 7:
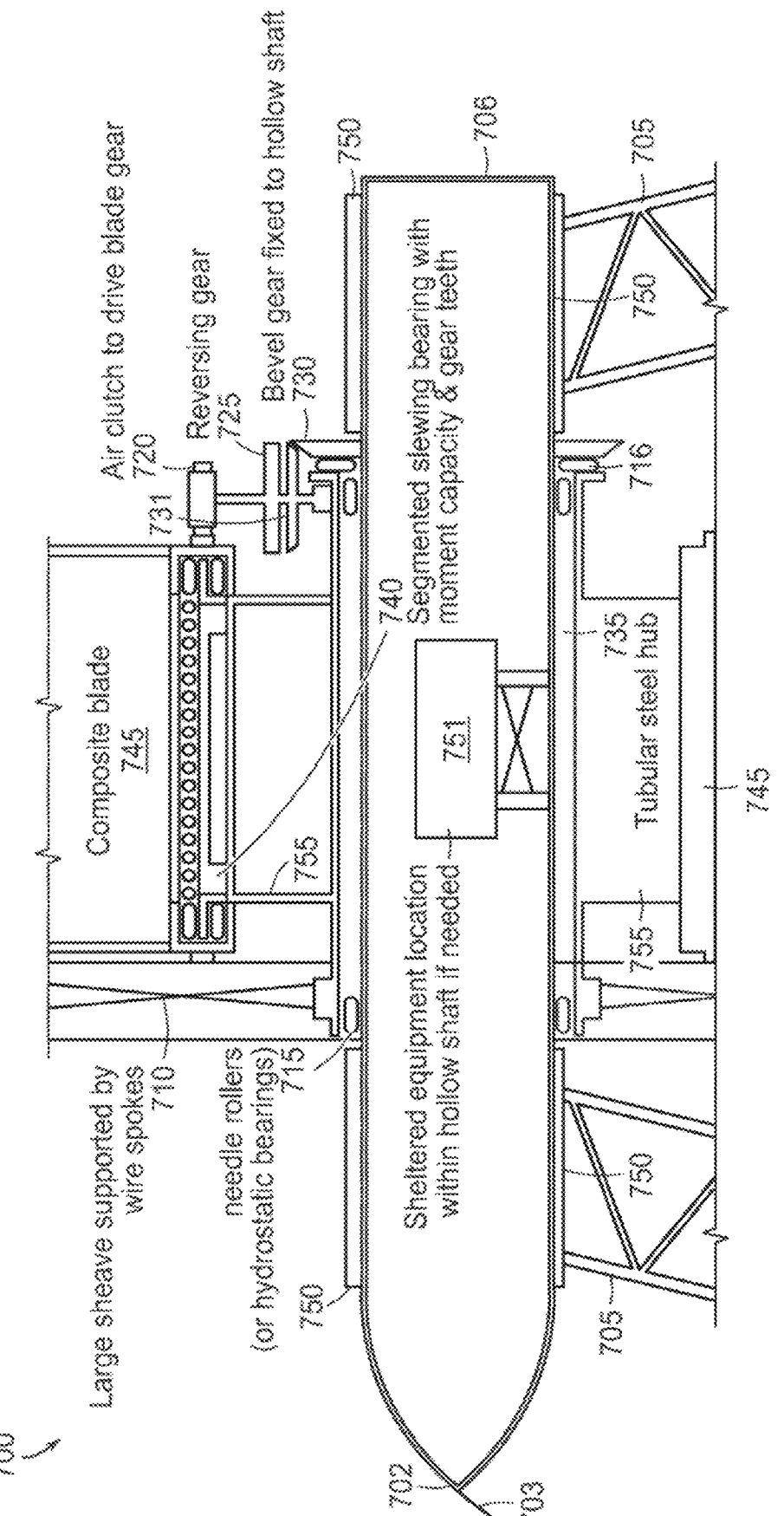
FIG. 7 provides a schematic cross-sectional view of a turbine rotor and how it can be structurally supported by the lattice towers. It includes a fixed tubular axle, hub roller and thrust bearings, blade pitch bearings with elastic matching, a rapid blade-pitch system driven by rotor rotation, a welded tubular hub, and a large belt sheave if belt drive is used.

FIG. 7 provides a schematic cross-sectional view of the turbine rotor 700 and how it can be structurally supported by the lattice towers 705. The central component at the tower top is a tubular non-rotating axle 706 (i.e., a fixed tubular axle unitizing the towers) that connects all towers and bears the loads of the heavy rotor. It is shown here with a point 702 at the upwind end, for connection to a mooring rope or tower brace 703 from the mooring attachment point. Two towers converge on an upwind clamping saddle 750 and two converge on a downwind clamping saddle 750 to support the axle. A tubular steel hub 735 with blade connection stubs 755 rotates on the axle, supported at both ends of the bore tube by needle rollers 715 (or hydrostatic fluid film bearings). Wind thrust forces are carried by downwind thrust rollers 716. The hub carries multiple components. Three composite blades 745 are mounted on slewing rings 740 (on blade stubs 755) constructed from segments of hardened steel plate. These have double rows of needle bearings and integral gear teeth, in order to rapidly adjust blade pitch on the fly for optimum aerodynamic efficiency, reduction in gust forces, and control of the rotor center of pressure in order to enhance yaw control of the floating turbine. A large sheave 710 supported by wire spokes in tension carries a 1 mm thick 2 m wide stainless steel drive belt, for low cost power transmission with rpm increase to a low level generator. The spokes are angled to provide torsional and axial bracing. Each blade is equipped with a gear system (725 and 731) to rapidly control blade pitch. The idea is that rotor kinetic energy is rapidly clutched to any blade to develop and then remove several degrees of blade pitch, while the blade is traversing one quadrant of the rotor circle. Blade pitching is effected through interaction with a single fixed bevel gear 730 mounted on the fixed axle. While this gear never turns, observed from the rotating hub it appears to be turning, so it can be used to power mechanisms on the hub.

The fixed bevel gear interacts with an input bevel gear 731 for blade pitch for each blade. As long as the rotor turns, the three input bevel gears also rotate on their shafts. Above the input bevel gear for any blade is a pair of reversing spur gears. Not visible in this figure, the second spur gear and its vertical shaft is behind the first. As the input bevel gear rotates in one direction, the gear and shaft above it rotates in the same direction, and its meshing partner and second shaft rotate in the opposite direction. At the top of these two shafts for each blade are air clutches 720 with external gears. When either air clutch is energized with air pressure, its gear is caused to turn, pitching the blade about its long axis. When energized, one air clutch causes the blade to pitch in the positive sense during rotor turning; the other air clutch will cause the blade to pitch in the negative sense. If both clutches are undesirably energized simultaneously, they will both slip at maximum torque until the rotor comes to rest. Braking of a large rotor is best accomplished by control of blade pitch to produce decelerating aerodynamic torque. Energizing both clutches at once is useful as a holding brake only. 751 is optional sheltered equipment that takes advantage of a sealed dry space.

Blades are conventionally connected by T bolts to the blade pitch bearings (discussed below).

The hub bore tube (See, e.g., FIG. 6 and FIG. 7) can also be a thin-wall large-diameter steel tube. Such a tube is close to an optimal cross section when moments might be applied in any direction, as long as thickness-to-radius is sufficient to prevent local buckling.

The axle (See FIG. 7) can likewise be a large thin-wall tube fitting through the hub bore tube. It is supported (built in) to the towers at both ends, and otherwise is as short as possible. Then bending stresses will be small in comparison with shear stresses.

Bearings for Rotor Turning

Bearing contact stresses under load (which define the degree of surface damage) can be computed from force per projected area. Stresses are minimized by a large projected area, and by using rollers rather than balls.

The main rotor bearing loads include the vertical (from weight, belt and heave acceleration); the axial (rotor thrust from wind and horizontal acceleration); and net moment from tilting (pitch or yaw) acceleration and precession velocity. The moments are expected to produce the main radial loads on the rotor bearings.

One of the cheapest and thinnest (with least impact on shaft diameter) bearings are needle rollers. Hardened precision shafting e.g. 1" diameter is widely available as a commodity, and can be cut into lengths to construct full complement needle bearings (e.g., 715). Axial loads can also be carried by needle rollers (e.g., 716) (possibly guided by a cage to preserve orientation) forming a thrust bearing. No special raceways will be needed as long as the contact stress is proportioned to the strength of the axle and hub bore tube materials. See FIG. 7.

An alternative way to support the turning rotor is a fluid film bearing maintained by a pump at high pressures (typically 1000 psi or greater). Such well-known 'hydrostatic' bearings must be designed to be stable against pressure gradients. This is commonly achieved by allowing multiple support areas to provide different pressures, e.g. through pressure reducing orifices leading to reduced pressure when flow is large. Then reduction of clearance at any point will lead to increased pressure, and vice versa, keeping the rotor centered and aligned. On the possibility that the hydrostatic pump ever fails, the moving surfaces can be provided with metal bushings for short time rotational service Bearings for Blade Pitch The blade pitch bearings (e.g., 740) transmit blade bending moments by thrust forces and require 5 m diameter raceways. A segmental design is preferred using multi-layer pieces can be shaped precisely by conventional CNC milling, then assembled ruggedly and precisely with bolts and pins. The material of choice is quenched and tempered abrasion-resistant commodity plate, probably the AR500 grade. This can be Blanchard-ground for smoothness, rough cut by waterjet or plasma cutting, then precise dimensions (including integral gear teeth) can be produced with carbide tooling. The idea is to form the needed large rings by multiple overlapping layers of arcuate segments that are 1.5 m-2 m long. Once precision-cut, these segments can be aligned and compressed with shoulder bolts, then some holes can be taper-reamed and taper-pinned for a load-bearing fit. If additional unitizing is needed, soldering or adhesive bonding can be adopted.

The races (e.g., of 740) will cooperate with well-known blade T bolts, and will provide integral gear teeth for control of blade pitch. Axial loading will be transmitted by a flange on one part (e.g., the blade), supported by needle rollers above and below in a double flange (U shape) connected to the hub. The much lower radial loads will be carried by a single row of rollers. Preferably the design incorporates elastic matching, such that the load-induced slope of the flange on the blade matches the load-induced slope of the flange on the hub. See FIG. 7.

Such a design is meant to be assembled onsite into a precision ring assembly that is too large for convenient trucking. By avoiding the manufacture of full rings, equipment such as large ring rollers, heat treating furnaces and grinders are not needed. This saves cost and lead time for a customer, and reduces the investment required of the producer.

Rapid Blade-Pitch Mechanism Without Electric or Hydraulic Actuator

Rapid pitch control of individual blades means that blade pitch can be tuned to the different wind velocity at different part of the large turbine disk. This optimizes power production and reduces unwanted gust loads. In addition, such control can be used to create intentional yawing torques, in order to correct undesired wave-induced yawing of the floating turbine.

The limiting factor in blade motion is the required power of the actuator. A high-power controllable actuator capable of rotating the blade several degrees in less than a second is costly. Conventional electric or hydraulic actuators can be dispensed with by utilizing the kinetic energy of the rotor. In the frame of the rotor the fixed axle appears to be turning at 10 rpm. This 'unstoppable' rotating shaft will be used for a power source that can be clutched independently to any or all blades, to pitch any blade in either direction at any moment. Since pitch rate of a blade cannot be changed instantaneously, the clutching process involves slip and energy dissipation. For example, blade spin inertia about its long axis can be estimated as a mass of 40,000 kg at a radius of 2.5 m. At a pitch rate of 12 deg/s its circumferential velocity is 0.5 m/s. In a clutching move to create velocity match, the work done is $mv^2$, half going to kinetic energy and half to slip. The acceleration time is $mv/F$, and power required is $Fv$. The unknown is the slipping force F to be applied. Selecting a force F=100,000 N, the time to reach maximum pitch rate is 0.2 s, during which time the rotor turns 12 degrees. The power used in frictional work and in overcoming inertia during that time is 50,000 W, about 0.5% of wind power during 3% of rotor turning time. To decelerate the pitch rate is expected to be energy neutral (just eliminating kinetic energy that was already created). With doubling the time (to deal with blade de-pitching) and tripling the power (to take into account 3 blades), we are considering a loss of 0.5% of wind power during 18% of the time, which seems negligible.

Gearing and clutching can be achieved as follows. FIG. 5 and FIG. 7 illustrate conventional spur gears (driven by a bevel gear on the stationary rotor axle, with added meshes to achieve velocity reversal) and industrial pneumatic clutches. But other approaches are possible, such as the use of capstan cables without gear teeth: the blade can be wrapped in two directions to be able to pitch it with tension only. The two ends would each be dragging lightly around fixed axle-drums, until engaged with pneumatic or other actuation to grip. If designed like wrap spring clutches, many conventional gripping and releasing strategies (involving a movable dog on the hub) become available.

When the rotor is at rest (either becalmed or parked), there is still a need to pitch any blade. Therefore, a backup battery-powered system is typically provided. This could be a 5 KW motor with 1:200 gearing and electric clutch, able to slowly rotate the blade when engaged.

Lattice Towers

The wind turbines disclosed herein are adapted to allow either the entire wind turbine or at least the towers together with the turbine rotor to yaw against the wind. Thus, there is no need to provide a slender (and structurally inefficient) tower, as is the case in conventional designs. A set of support columns (also referred to herein as "towers") on a spread base (i.e. spaced to rest on the support floats) is very efficient, and if carefully designed the support columns will be subjected to compression only. The towers structurally support the turbine rotor.

A support column with enough area to resist compressive yield will, if long enough, buckle. To prevent buckling a sufficiently large radius of gyration is needed. If this is provided in tubular form, at great enough length the wall has to be so thin that local buckling appears. A more efficient structure in that case is a lattice tower, similar to a tall radio mast. (A lattice tower also has less aerodynamic drag area, and its fabrication can be performed by conventional manual welding.)

The lattice towers can be fabricated in boltable 40-ft lengths, in a fixture that permits easy rotation about the column axis for weld access.

Traditional concerns for lattice towers include corrosion and bird nesting. Cutting the lacing members so the diagonals are vertical and horizontal sheds water more easily and discourages perching. Additional protective material can be used as necessary.

Craneless Erection on Unimproved Soil, Followed by Air-Cushion Launch Into Shallow Water In embodiments, the floating wind turbine is meant to have a shallow draft, for example, a draft of around 4 m, in contrast to most floating turbine concepts with spar buoyancy exceeding 20 m draft. A shallow draft allows for boat-ramp launching into shallow water, after construction at the water's edge. It can also be transferred from a dock surface above the water surface, onto grounded box-floats, that can then be air-filled to rise a few inches and float the turbine away. Once in slightly deeper water the boxes can be lowered by bleeding air, until they can be removed.

In order to travel freely on flat land and smoothly enter very shallow water, the erected turbine can be provided with four air cushion transporters each able to support 25% of the turbine weight, e.g., each able to support 300,000 lb. Assuming a pressure of 6 psi, these would be about 20 ft×20 ft (or at 3 psi, close to 30 ft×30 ft), and they would float under load in water at a depth of 14 ft (like the shallow berth of the New Bedford Marine Commerce Terminal) or, with 3 psi, at 7 ft.

The air cushion transporters can each be formed as two half-cushions, each shaped to transport a half turbine float. Half-floats would be moved over to the wind turbine legs with attached air cushions, then joined to the special bottoms of the legs (also referred to herein as "towers") without requiring the structure to be raised. Finally, the turbine with floats can be transported over soil or pavement into the water. By flooding and removing the air-cushion segments, the turbine can be supported by its floats and the air cushions can be returned to land.

An advantage of the wind turbines which include multi-segment (e.g., 10-segment) lattice towers is that they can be constructed using a cost-efficient craneless erection method. A lattice segment may be 40 ft long weighing about 2 tons, or any other convenient length.

The method comprises (i) providing a turbine axle (e.g., 706) carrying surrounding rotatable hub (e.g., 735) with belt sheave if used, (ii) structurally coupling the topmost lattice tower segments to the axle ends with bolted tube saddles (e.g., 750) (see, e.g., FIG. 7 for such a coupling), (iii) hoisting the first lattice tower segments simultaneously by their feet to a height that allows a plurality of second lattice tower segments to be structurally connected (e.g., bolted or welded) to the first plurality of lattice tower segments, (iv) structurally connecting (e.g., welding) the plurality of second lattice tower segments to the plurality of first lattice tower segments; (v) lowering the second lattice tower segments to the ground and moving the hoists to grip the bottom ends of the second lattice tower segments, and repeating steps (iii)-(v) until the wind turbine has a plurality of lattice towers of the desired height. Temporary braces between the growing towers can be used until the final bottom inter-float and inter-tower braces are installed. The hoisting can be achieved using multiple appropriately dimensioned inexpensive hoist towers. For example, if the lattice tower segments are to be of a certain length, the lifting tower will typically allow to lift the so-far assembled lattice tower to a height that is sufficient to attach one further lattice tower segment. Blades can be attached once the length of the assembled towers and accordingly the height of the so-far assembled wind turbine structure is of a sufficient height to allow it.

Figure 8:
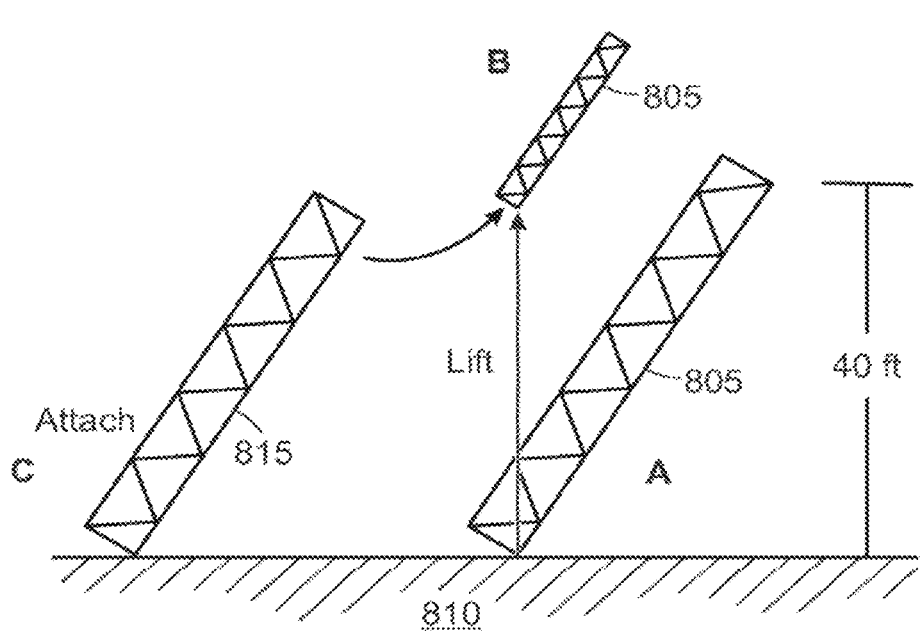
FIG. 8 illustrates steps of an embodiment of a method for crane-less construction of a wind turbine of the present disclosure, including the steps of hoisting the growing structure from the ground (position A) to a height (position B) sufficient to move and structurally connect (e.g., weld) a further tower segment (in or from position C) to the elevated tower segment (in hoisted position B).

FIG. 8 illustrates the steps of jacking the bottom-most tower segment 805 from the ground 810 (position A) to a height (position B) sufficient to move and structurally connect (e.g., weld) a further tower segment 815 (in or from position C) to the elevated tower segment 805 (in position B). This method is utilized simultaneously for each of the plurality of legs (e.g. lattice towers) of the wind turbine.

Figure 9A:
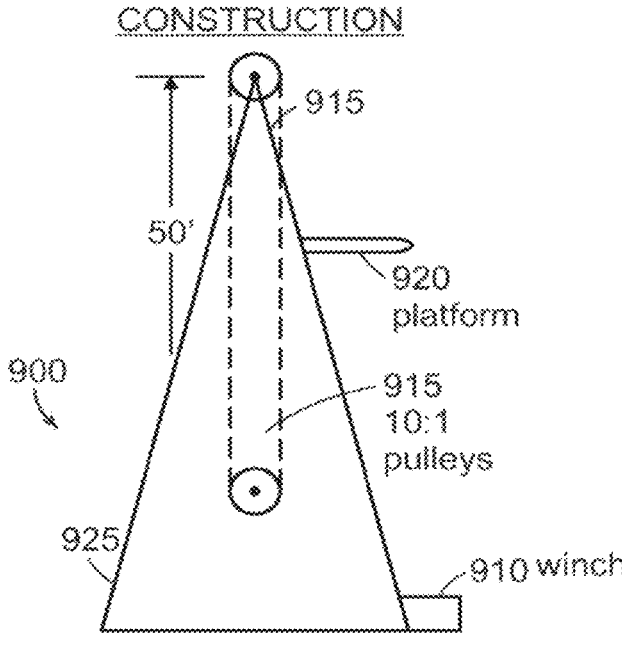
FIG. 9A provides a schematic side-view of an embodiment of a short lifting tower suitable for hoisting of the growing turbine according to the method illustrated in FIG. 8.
Figure 9B:
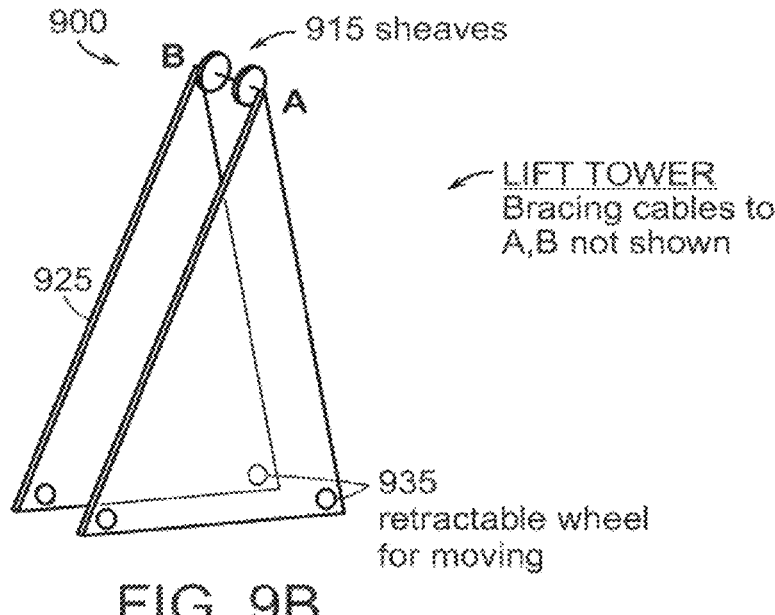
FIG. 9B further illustrates the embodiment of a lifting tower shown in FIG. 9A.
Figure 9C:
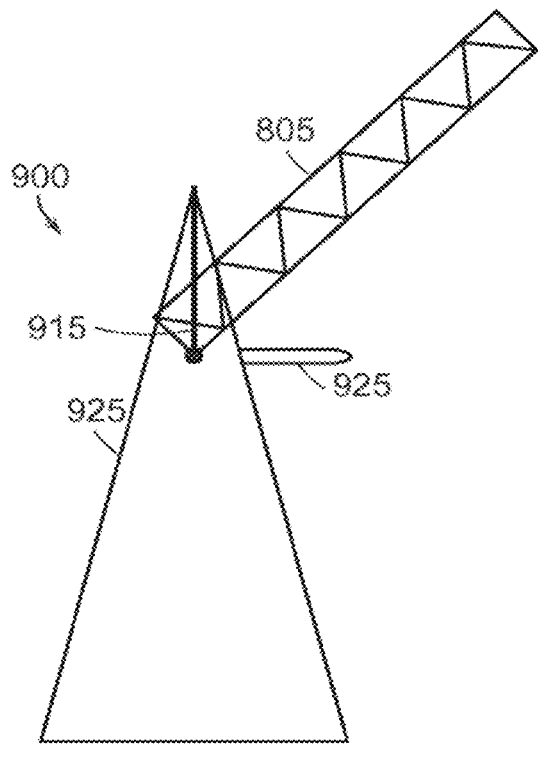
FIG. 9C illustrates the lifting tower of FIG. 9A and FIG. 9B with a leg (e.g., lattice tower) of the partially assembled wind turbine structure jacked to the height at which a further leg segment can be structurally attached at the bottom of the elevated leg segment.

FIG. 9A provides a schematic side-view of an embodiment of a lifting tower 900 suitable for jacking of tower segments. The lifting tower includes a winch 910, upper and lower pulleys 915, and a work platform 920, and a structural frame 925 that supports lifting the desired weights and straddling of the tower segments. Pulleys can be used to amplify winch force, for example, a 10 ton winch force can be amplified to 100 tons. FIG. 9B further illustrates the embodiment of a lifting tower 900 shown in FIG. 9A. This view further shows optional retractable wheels for moving of the lifting tower as well as upper pulleys 915. FIG. 9C illustrates the lifting tower of FIG. 9A and FIG. 9B with a leg (e.g., lattice tower) of the partially assembled wind turbine structure jacked to the height at which a further leg segment can be structurally attached at the bottom of the elevated leg segment.

The crane-less erection scheme (FIG. 9A-9C) can be based on 40-ft leg-truss segments, and four 40-ft hoists able to simultaneously lift the bottom of each leg of a partially assembled structure, and also winch a truss segment under that structure to join to what already exists. The structure will need temporary cable braces until it is complete, and the lifting hoists may also need anchoring or bracing for each lift to make sure they are stable.

In the very first stage, the axle with hub is connected to the first four truss segments. This might be accomplished by the same hoisting process, or possibly would be performed at ground level after which the beginning assembly is pulled upright. At that point when the hub is still close to the ground, two blades can be installed sequentially in 'rabbit ear' position (namely 10:00 and 2:00). A blade on the ground needs to be cable- (or rocker-) supported near its CM so its hub end can easily be tipped and slightly displaced to meet the hub pitch bearing, so bolting can draw the two components together.

Once one blade is mounted, a temporary kingpin on the hub, and an anchored cable or a dead weight will be able to rotate the first blade well above horizontal, so the second blade can be installed in a manner similar to the first. With two blades installed and braced to prevent rotation away from 'rabbit ears' position, the tower can be lengthened by extending its four legs. Once it is nearly finished, the third blade can be hoisted to the axle in a vertical orientation, for bolting to the bottom (6:00) pitch bearing.

The assembly process is to lift the entire structure at four points (the four current feet) a height of 40 ft. When the turbine is nearly complete this requires a lift force of about 150 tons for each leg. Then the next two-ton leg segment is hoisted and joined, after which the structure is lowered to rest on its new feet. Lastly the hoists are rolled to the new foot positions and the process is repeated.

The hoists can be designed so a short vertical support post can be installed as a very final step, resting on a compact reinforced slab. Then with the hoists withdrawn, float halves on air cushion transporters can be connected to each other around the post (which may finally be removed for reuse, allowing the turbine to rest on the floats supported by air cushions).

Multifunctional Turbine Floats

Typically, wind turbines with higher power capacity will require, among other things, larger blades, larger rotor diameter, larger hub height, and larger towers, which leads to larger weight which the floats have to support. The wind turbines described herein have much shallower draft compared to known floating wind turbines. Still, the floats must provide the desired water displacement at the desired draft, with a significant reserve buoyancy (e.g., double the minimum) to deal with higher wind thrust possibly combined with a large pitch angle caused by wave-face slope. Further, the floats can must provide sufficient 'stiffness' to stabilize the turbine in pitch and roll. As is well known, buoyant stabilization of a collection of shallow-draft floats is based primarily on the waterline area of each float, times the weight density of the water, times the square of the distance of each float from the central rotation (i.e. tipping) axis, summed over all floats. (The sum of areas times squared distances is approximately the second moment of waterline area, which to be precise should include the second moments of each individual area around its own center). Multiplied by the weight density of water, it effectively forms a torsional spring constant to resist tipping or capsizing.

In embodiments, the floats are dimensioned and spaced relative to each other such that the wind turbine attains buoyant natural frequencies that are high in comparison to typical wave frequencies. This can reduce wave-excited motion.

In order to minimize material usage for the floats, a low stress design to carry leg force via membrane (not bending) stresses can be used. Cylindrical shapes achieve low circumferential stress for radial pressure, but suffer high bending stress if there is a flat pressure-bearing bottom or top. A conical shape (or a pyramidal approximation) of 10 mm-16 mm thickness will experience low stress from fluid pressures, and a bottom point will help in reducing slamming force in case a float ever leaves water. Another option for saving material is to leave the float bottom open, with air trapped in a bladder. In general tank material is minimized for an equi-axed submerged shape (height in proportion to width). If the bottom is open, then a height of half the width can be better.

Radian heave frequency of a flexibly supported object is sqrt(k/M), where k is the stiffness (restoring force per unit displacement) and M is the mass, here of one fourth the entire turbine. For a body in fluid of mass density rhoF the effective vertical stiffness is (rhoF)(g)(A) where A is the area where the body is intersected by the fluid surface. If the waterline float radius is R, A=pi*R^2, the heave frequency is approximately R*sqrt(rhoF g pi/M) showing proportionality to R if we seek a high frequency with fixed M. It is also well known that heave frequency may be approximated as sqrt (g/draft) where draft is an approximation to how far a vessel's weight pushes it into the water. Therefore, high natural frequency is associated with small draft. Natural frequency in heave is also influenced by 'added mass'— water that moves vertically along with the float. That mass is large for a wide flat float, and is small for a sharply conical float. Our designs attempt to minimize added mass, to keep natural frequency high. Note too that the stiffness of a taut mooring rope also contributes to the natural frequency.

In some embodiments, the one or more, or all of the plurality of floats have an apex-up top cone (e.g., with about a radius of 6 m and 45 degrees slope) truncated to conveniently transfer leg load to the sloped cone surface. The top cone rests on top of an apex-down bottom cone with similar shape, which can be truncated to reduce draft. If we leave a central hole the communication of hydrostatic pressure may reduce the stress, and there will be room to mount hardware such as a rudder.

Since the float will have dynamic interactions with the water, the following features for steering, to reduce or minimize drag, for buoyancy control, and/or direction control, can be desirable for one or more, or all of the plurality of floats of the wind turbine.

In some embodiments, a float has a rotatable rudder for steering relative to the moving fluid of a wave surface. This can help mitigate the yaw-disturbing effects of waves and off-axis wind. The rudder can generate horizontal steering forces from wave orbital velocity. A rudder on each float can either be steered with an actuator, or it can generate force by using trim tabs to orient relative to the flow.

Figure 10:
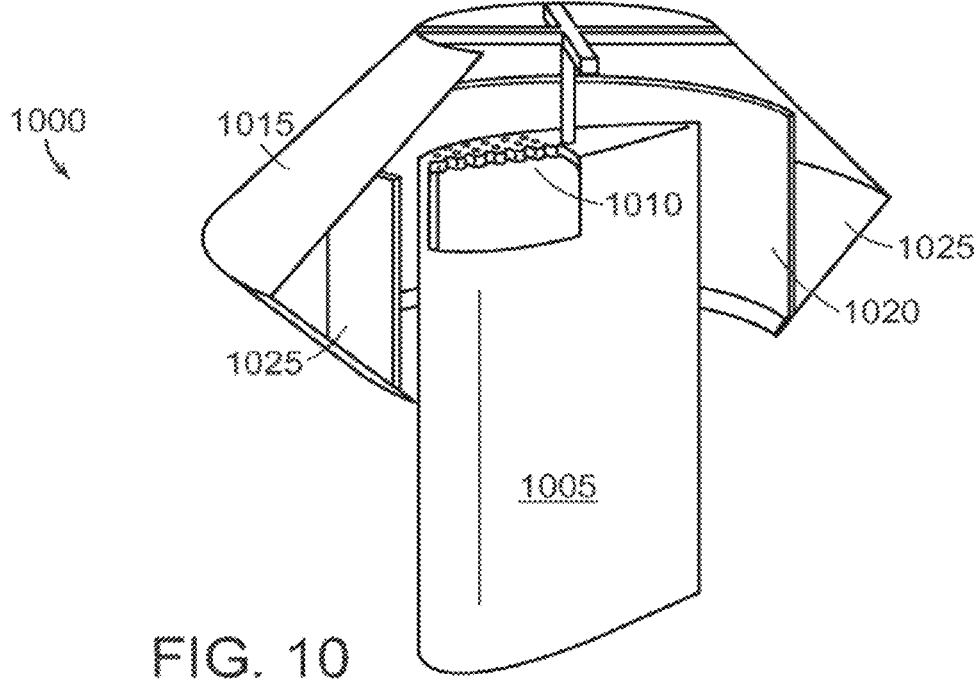
FIG. 10 illustrates a float including a rudder-shaped open-bottom tube which allows for both steering (by rotation to a desired direction) and vertical force control (by valving of air above an enclosed water column).

FIG. 10 illustrates a float 1000 including a wing-shaped tube 1005 which is hollow and has an opening in the bottom part of the tube (not shown). The wing-shaped tube 1005 can act as a steering rudder in case it is needed to steer in big waves coming from an angle. The rudder might be turned one way as the turbine ascends the wave face, and be turned another way (responsive to turbine wandering) as it descends the back face. The wing-shaped tube 1005 can further act as a vertical-force control system. The length of the wing-shaped tube 1005 increases depth of water penetration, but not with buoyant materials, accordingly, the length from the tube opening to the water level within the tube is not part of the "draft". The water in this tube could rise and fall as the float moves up and down with a wave. The top of the tube represents fast-acting valves 1010, that can control airflow. This can leave the tube with an excess of water, so it becomes a large added mass to prevent lifting up, or an excess of air providing reserve buoyancy. Control of the valve allows resisting both the rise and fall of interior water, so it can become a very effective damper of any oscillations relative to the water surface. The float 1000 further includes a truncated biconical hull 1015 (shown in cross-section) as well as a cylindrical interior wall 1020 (shown in cross-section) which together define a hollow space 1025 with air which provides the desired buoyancy to support the low-weight turbine with a margin of safety.

In some embodiments, a float can be shaped with a prow and stern in order to reduce or minimize drag forces of wave orbital velocities. In aspects of these embodiments, the float can be shaped with a prow and stern, that may be re-orientable to match predominant wave direction.

In some embodiments, a float allows for buoyancy control. For example, by temporarily trapping air or water the float can gain mass, and gain or lose buoyancy. The needed actuation is to rapidly control a large airport, for example, with a flap valve or a rolling ribbon valve. Both of these have small actuation forces and can be opened or closed in a fraction of a second. Some potential uses include: (A) If a float is rising out of the water, trapping a large weight of water will increase the restoring force from further rise. (And if penetrating more deeply than normal, air can be trapped, to increase the resistance to further penetration.) (B) If a float is moving up and down relative to the water surface, delaying water entry and egress by controlling air motion will provide significant damping. To enhance these effects, once in deep water the turbine may deploy a vertical tube at each float, with air-valving at its above-water top. This tube could also perform the rudder function, and it can be located on the float centerline rather than outside the float perimeter. Such deployable tubes are not part of the draft and do not impede launch in shallow water, nor lower the natural frequency as long as the valves are open.

In some embodiments, a float may be equipped with powered steerable thrusters such as propellers. The cost can be justified by the ability to untwist the mooring cable, to maintain a desired heading with heavy waves but light wind, or to make small corrections to small disturbances before they become too large.

At least in level water, a float possesses a property of 'added mass for vertical acceleration', in which some water is accelerated along with the float, increasing its effective mass and reducing the natural frequency. For a vertical cylindrical float, the added mass is roughly that of a hemisphere of water, capping the float bottom. For shallow wide floats, this added mass can exceed the wind turbine mass. To reduce added mass (note that in-phase wave excitation may not involve added mass, since water is already moving with the wave), N smaller separated vertical cylinders with the same total cross section can be used. Then the added mass is proportional to 1/sqrt(N), easily reducing its influence. Added mass reduction is useful when attempting to keep the natural frequency above wave frequencies. This goal is quite opposite of normal practice, where natural frequency is pushed below wave frequency, by use of reduced waterline area and a stabilization approach relying on large-draft ballast.

To the extent that the waves cause turbine pitching, the rotor will experience a wind velocity varying from (V+v) to (V−v). Assuming blade pitch is properly adjusted to suit, the time average power delivered to the rotor (proportional to the cube of relative velocity) is augmented by the factor $(1+3v^2/V^2)$. When waves are significant this can add a few percent to the captured power below rated wind speed. In other words, the turbine in waves may be viewed as a combined wave and wind energy harvester.

Control of Resonant Motion in the Water

As described above, the floats can be adapted to be able to trap water. To control roll resonance the effective mass of the floats can be increased by trapping water, thereby lowering the natural frequency in roll.

To reduce the risk of damaging resonance (either rigid-body turbine motion, or elastic deformation of a component) arises from periodic forcing, a "tuned mass damper" or TMD can be used. This splits a resonant response peak into two peaks, one on either side of a defined frequency. It would be typically used where forcing frequency is invariable. But since the floating wind turbine may be susceptible to a range of disturbing frequencies, it can be valuable to retune the TMD to cancel any observed growing vibration. Classically this can be done by shifting a spring support point. It should also be possible to add or subtract water mass. But a particularly convenient approach is to use a pneumatic spring (e.g. Firestone Air Spring). Especially if two air springs are loaded in opposition to squeeze a vibrating TMD mass, then the stiffness they provide is proportional to air pressure, which can be quickly changed by an order of magnitude without moving significant mass.

In further embodiments, the wind turbine is not ballasted, so stability is derived by its waterline area. This can lead to very shallow draft (e.g. 2 m), permitting assembly at a shallow port.

In further embodiments, the wind turbine can yaw at its mooring to face the wind, driven either by the wind or other ways as describe herein.

In further embodiments, the mooring connection consists of a single cable, or other device making the restraint force act in a defined direction. That defined slope (e.g., 1.5:1) affects many aspects of the design, including the anchor force, the flotation needed, the hull length, and required tower strength In further embodiments, a mooring cable is attach to the seafloor.

In further embodiments, a mooring cable is attached to a point defined by three anchor cables converging on a subsurface buoy.

In further embodiments, the restraint force from mooring is directed to intersect the wind force and system weight at a single point. This means that changes in wind exert no pitching moments about this point and the barge/turbine assembly does not pitch under this loading.

In further embodiments, the floats have a vertically prismatic hull. If a turbine with no wind is in balance (center of mass over center of buoyancy) and if the buoyant material above that float is prismatic, and symmetric relative to the vertical line through the intersection of mooring force and wind thrust, then the turbine remains level at any value of wind thrust.

In further embodiments, the mooring cable (or a structural member collinear with the mooring cable aimed near the rotor axle) is anchored to the rotor axle to make the tower loads purely vertical. Using water-level standoffs for the mooring cable attachment point adds to pitch stability.

In further embodiments, the wind turbine does not have a yawing system at the rotor axis.

In further embodiments, the wind turbine does not have a single tower design.

In further embodiments, a dual or quadruple lattice tower supports the rotor axis at both ends, eliminating overhung loads, and permitting use of cheap hydrostatic rotor bearings.

In further embodiments, the generator is sited on deck. This allows for better stability and easier maintenance.

In further embodiments, a mechanical drive is used to couple rotor rotation to the generator. A belt drive or rope drive costs far less than a gearbox, and is overload tolerant. With this system there would be no maintenance needs at the rotor shaft. A full hard stainless belt offers advantages compared to other materials and configurations.

In further embodiments, three neutrally buoyant anchor ropes converge at a submerged small buoy. From the buoy to a point on the floating wind turbine, a single mooring line rises at a defined angle to intersect the wind thrust line above the system center of gravity, to control the angle of the mooring force reacting wind thrust. (That angle is slightly steeper than the slope of the plane defined by any two anchor lines.) For example, a 1.5:1 slope of the single line. It may be attached near the rotor axle for structural efficiency, and its position may be controlled relative to the floating hull with rigid standoffs.

In further embodiments, the wind turbine does not have a nacelle. In these embodiments, a nacelle is not needed because there is no yawing bearing or drive, no gearbox, and no generator at the rotor hub. The two-sided support of the axle reduces structural weight and makes large hydrostatic bearings or needle roller bearings economical.

In further embodiments, a rotation-transmitting mechanical drive can be used to transmit rotor torque to a generator at the tower base. This can include but is not limited to a belt-type or rotary shaft drive. Previous approaches used a rope driven at the rotor periphery (for modern large rotors this leads to excessive sheave size and impractical rope speed) or a small-sheave belt drive (this leads to excessive belt tensions, meanwhile retaining an expensive gearbox to achieve high rpm of the generator). We find that a metal belt 1.5 m wide and 1 mm thick driven by a 30 m diameter sheave can transmit rotor power to the barge deck, at an rpm that allows use of a small and inexpensive high speed generator. This approach is inexpensive, offers a useful fatigue lifetime, and virtually eliminates tower-top maintenance. To work in all load cases without high tension in the slack side of the belt (which stresses the tower), pinch rollers may be useful.

In further embodiments, the wind turbine has a single mooring cable. This so-called "single line mooring" allows for weathervane yawing of the entire turbine structure with controlled mooring force direction (to permit rise and fall with the tide, while preventing platform pitch due to wind load).

In further embodiments, the mooring cable is a synthetic mooring rope attached near the rotor axis to reduce tower strength requirements and increase stability.

In further embodiments, the towers include upwind and downwind towers. This reduces needed axle weight because of support from both ends, but the downwind towers must be sloped to prevent strike of a deflected blade.

In further embodiments, the turbine rotor is supported on a fixed axle with no nacelle. In an aspect of these embodiments, the towers can be lattice construction, framed to the rotor axle.

In further embodiments, the angled towers mate to a wide base of floating barges, to enhance pitch stability.

In further embodiments, power is transmitted mechanically down to a low-level generator. The generator can be a small high-speed generator at deck level, with no expensive gearbox.

In further embodiments, the belt drive is a band of stainless steel or multiple wire ropes encased in rubber (like a mine conveyor belt).

In further embodiments, the wind turbine further comprises traction control pressure wheels at the small generator sheave.

Further Definitions

As used herein, the singular forms "a," "an" and "the" include plural referents unless the content clearly dictates otherwise. For example, reference to "a cell" includes a combination of two or more cells, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

EXAMPLES

The present examples are non-limiting implementations of the present technology.

Example 1: 10 MW Wind Turbine

A 10 MW floating wind turbine 100 is illustrated in FIG. 1. Four floats 105 (e.g., floating tanks, are here shown cylindrical with implied internal bracing, but can be of a variety of shapes with or without bracing) support the system weight with very shallow draft (for example, about 2 m). The horizontal spread of these floats (here, at the corners of a 40 m square) prevents tipping. They are connected together with taut cables 115 and horizontal trusses 110, which also support the small high-speed generator 120. In operation the wind comes from the belt side, i.e. from the left in this image. The axle 130 and hub 132 defining the rotor axis (there is no nacelle which conventionally covers a gearbox, a rotating rotor shaft, a generator, and a yawing system) are about 120 m above the water where it structurally joins four towers 135, two upwind and two downwind. Under a strong wind, the blades (which can be commercially available blades; the specific shape of the blades is not illustrated and can vary) 140 will bend downwind, away from the drive belt, but not far enough to strike the downwind legs. The rotor carries three about 90 m long blades 140 following the DTU reference design, and an about 30 m diameter sheave 145, which drives a belt 150 (e.g., a ribbon of full-hard stainless steel, 1.5 m wide and 1 mm thick). The belt 150 wraps around an about 1 m diameter small drum (not shown) at the generator 120. The mooring cable 155 (e.g., a synthetic mooring rope) emerges from an underwater mooring point (not shown). The mooring cable 155 can pass all the way to the axle 130 at the top of the tower (in this case 157 is also the mooring cable). Here, the mooring cable 155 connects to an attachment point 156 on a standoff structure 160. 157 is a different cable, collinear (or typically at least substantially collinear) with the mooring cable 155. Alternatively, 157 can be a tensile brace like a metal tube. The upper end of 157 connects the axle 130, to eliminate horizontal tower loads. At the water level it is held windward of the base, by two neutrally buoyant standoff tubes (i.e., a standoff structure) 160. When the wind is blowing, the entire turbine floats downwind of the mooring point and automatically faces the wind. The axle 130 does not rotate and the hub 132 (with blades 140 and sheave 145) rotates around the axle on which it sits, between the towers.

Example 2: 10 MW Wind Turbine

A 10 MW floating wind turbine 200 is illustrated in FIG. 2. Four floats 205 (e.g., floating tanks, here of approximately bifrustum shape (e.g., truncated cone on top connected at its base perimeter to the base perimeter of a cone with apex facing downward); here, only the part of the float above water line is illustrated) support the wind turbine weight with very shallow draft (for example, about 4 m). The horizontal spread of these floats (here, with corners of a 60 m square) prevents tipping. They are connected together with cables 215 and rigid connections (e.g., horizontal trusses below the water surface) 210, which help support the small high-speed generator 220 on a cable-supported platform 222 elevated relative to the waterline. The wind may come from the left to strike the sheave and drive belt before the rotor. The hub and axle 230 defining the rotor axis (there is no nacelle) (see FIGS. 5 and 7 for further illustration) is about 120 m above the water where it structurally joins four towers 235, two upwind and two downwind. Under a strong wind, the blades (which can be commercially available blades; the specific shape of the blades is not illustrated and can vary) 240 will bend downwind, away from the drive belt, but not far enough to strike the downwind legs. The rotor carries three about 90 m long blades 240 and an about 30 m diameter sheave 245, which drives a belt 250 (e.g., a ribbon of full-hard stainless steel, 2 m wide and 1 mm thick). The belt 250 wraps around an about 1 m diameter small drum 221 at the generator 220. The mooring cable 255 (e.g., a synthetic mooring rope) is attached to an underwater mooring point (not shown), and rises at a slope (e.g., 1.5:1 or 3:1 slope) to connect to an attachment point 256 at water level. At the water level it is held windward of the base, by two neutrally buoyant standoff tubes (i.e., a standoff structure) 260. From the attachment point 256, a rope (likely but not necessarily different) or other tensile element 257 rises at the same or substantially the same slope and connects to the non-rotating axle 230, to reduce tower loads.

The four lattice towers 235 are each square with 100 inch sides. The corner members are 7>7×³⁄₁₆, of A570 grade 50, each with a cross section area of 5.25 in^2. The single-lacing diagonal members butt-welded at 30 degrees from the column axis are 4×4×0.083 (=14 gauge). The towers can be manually welded in boltable 40-ft lengths, in a fixture that permits easy rotation about the column axis for good welding access.

RELATED PATENT LITERATURE

German Patent Application Publication No. 102012009145A1, entitled "Wind turbine with horizontal rotor shaft and with rotatable tower", filed May 8, 2012.
German Patent Application Publication No. 202016001490U1, entitled "Tower construction for a wind turbine", filed Mar. 8, 2016.

PCT Application No. PCT/EP2012/054552, entitled "An offshore floating wind turbine for electric power generation", filed Mar. 15, 2012, and published as WO 2013/135291A1 (incorporated by reference).

U.S. Pat. No. 8,729,723, entitled "Removable offshore wind turbines with pre-installed mooring system", issued May 20, 2014 (incorporated by reference).

PCT Application No. PCT/EP2014/052224, entitled "Wind turbine", filed Feb. 5, 2014, and published as WO 2014/122165A1 (incorporated by reference).

U.S. Pat. No. 8,801,363, entitled "Wind turbine with pulley transfer box apparatus", issued Aug. 12, 2014 (incorporated by reference).

PCT Application No. PCT/EP2014/052224, entitled "Floating wind turbine structure", filed Apr. 17, 2014, and published as WO 2014/170027A1 (incorporated by reference).

U.S. Pat. No. 9,976,540, entitled "Floating wind turbine structure", issued May 22, 2018 (incorporated by reference).

Chinese Patent Application Publication No. CN 105569928A, entitled "Single point mooring type deep sea floating type draught fan, filed Dec. 23, 2015.

U.S. Pat. No. 8,178,993, entitled "Floating wind turbine with turbine anchor", issued May 15, 2012 (incorporated by reference).

The teachings of the documents cited herein are hereby incorporated by reference.

EQUIVALENTS

The present technology (including present methods) is not limited to the particular embodiments described in this application, which are intended as individual illustrations of aspects of the present technology. Many modifications and variations of the present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the appended claims. The present technology is to be limited only by the terms of the appended claims, along with the full scope of equivalents to which such claims are entitled. It is to be understood that this present technology is not limited to particular methods, compounds, compositions, disease pathologies, or devices, which can, of course, vary. It is also to be understood that the terminology used herein is for the purpose of describing particular embodiments only, and is not intended to be limiting.

What is claimed is:

1. A shallow draft, ocean-borne wind turbine having a mass of at least 30,000 kg, the wind turbine comprising:

a square floating structure of four interconnected circular floats defining an area, A, the floats connected diagonally with rigid trusses;

a superstructure extending upward from the floating structure comprising four struts supported by respective floats and forming an apex;

a nacelle-less turbine rotor mounted at the apex, the rotor including a direct drive generator;

a plurality of turbine blades for driving the rotor, each turbine blade having a length, l; and wherein the floating structure is moored with a mooring cable attached to a fixed underwater mooring point; and wherein the wind turbine has a rate power capacity of at least 3 MW; and wherein the draft in operation of the floating structure is less than 1/6.

* * * * *